(12) United States Patent
Kessler et al.

(10) Patent No.: US 11,506,903 B2
(45) Date of Patent: Nov. 22, 2022

(54) WEARABLE NEAR-TO-EYE DISPLAY WITH UNHINDERED PRIMARY FIELD OF VIEW

(71) Applicant: Amalgamated Vision, LLC, Brentwood, TN (US)

(72) Inventors: David Kessler, New York, NY (US); Adam J. Davis, Brentwood, TN (US); Randall Sprague, Hansville, WA (US)

(73) Assignee: Amalgamated Vision, LLC, Brentwood, TN (US)

( * ) Notice: Subject to any disclaimer, the term of this patent is extended or adjusted under 35 U.S.C. 154(b) by 0 days.

(21) Appl. No.: 17/695,249

(22) Filed: Mar. 15, 2022

(65) Prior Publication Data

US 2022/0299775 A1 Sep. 22, 2022

Related U.S. Application Data

(60) Provisional application No. 63/162,052, filed on Mar. 17, 2021.

(51) Int. Cl.
*G02B 27/01* (2006.01)
*G02B 5/30* (2006.01)

(52) U.S. Cl.
CPC ....... *G02B 27/0172* (2013.01); *G02B 5/3083* (2013.01); *G02B 27/0179* (2013.01); *G02B 2027/014* (2013.01); *G02B 2027/0192* (2013.01)

(58) Field of Classification Search
CPC .............. G02B 27/0172; G02B 5/3083; G02B 27/0179; G02B 2027/014; G02B 2027/0192
See application file for complete search history.

(56) References Cited

U.S. PATENT DOCUMENTS

| | | | |
|---|---|---|---|
| 10,268,041 B2 | 4/2019 | Davis | |
| 10,816,795 B2 | 10/2020 | Kessler et al. | |
| 11,340,451 B2 * | 5/2022 | Kessler | ................ G02B 26/101 |
| 2004/0113867 A1 | 6/2004 | Tomine et al. | |
| 2005/0237271 A1 | 10/2005 | Yamamoto | |
| 2007/0070508 A1 | 3/2007 | Ruble et al. | |
| 2011/0254992 A1 * | 10/2011 | Abe | ..................... G02B 13/004 |
| | | | 348/340 |
| 2012/0280893 A1 | 11/2012 | Holakovszky | |
| 2014/0146394 A1 | 5/2014 | Tout et al. | |
| 2020/0400943 A1 * | 12/2020 | Kessler | .............. G02B 27/0172 |
| 2022/0299775 A1 * | 9/2022 | Kessler | ................ G02B 5/3083 |

* cited by examiner

*Primary Examiner* — Dmitriy Bolotin
(74) *Attorney, Agent, or Firm* — Louis S. Horvath

(57) ABSTRACT

An optical apparatus has an electroluminescent display energizable to emit image-bearing light along an optical axis. A reflective polarizer reflects light of a first polarization state and transmit light of a second polarization state orthogonal to the first polarization state. A quarter wave plate in the path of transmitted light of the second polarization state imparts retardance to conveyed light. A curved, partially reflective surface transmits incident light. An exit lens directs light from the curved, partially reflective surface to an exit pupil, with an eye relief of less than the focal length of an eye, wherein the optical apparatus forms an image with a field of view exceeding 40 degrees horizontally and 20 degrees vertically. The optical apparatus is configured for seating directly against the face of the viewer, to form the image peripheral to a primary field of view.

18 Claims, 19 Drawing Sheets

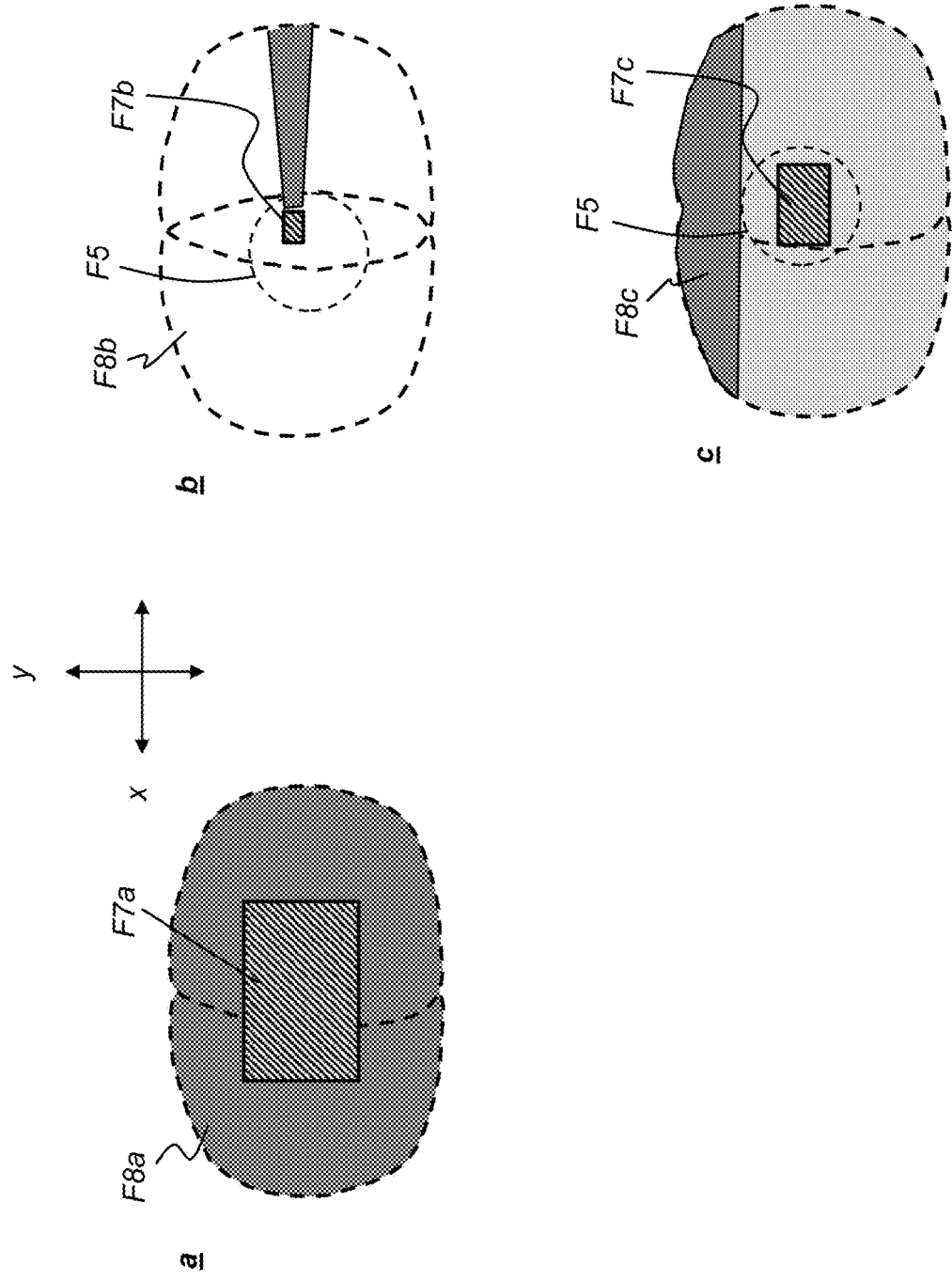

WEARABLE NEAR-TO-EYE DISPLAY WITH UNHINDERED PRIMARY FIELD OF VIEW

CROSS REFERENCE TO RELATED APPLICATIONS

This application claims the benefit of U.S. Provisional Application Ser. 63/162,052 entitled "Wearable Display for Near-to-Eye Viewing" by David Kessler et al., filed 17 Mar. 2021 and incorporated herein in its entirety.

TECHNICAL FIELD

The present disclosure relates generally to near-to-eye displays and more particularly to a wearable display that allows full visibility of the primary or central vision field of view and employs an electroluminescent array and an imaging apparatus that directs a collimated beam to an eye box for viewing.

BACKGROUND

There have been a number of solutions proposed for providing image content from wearable devices. Various types of goggles, glasses, and other apparatus have been described for displaying image content to a viewer who is wearing the apparatus. These devices may be completely immersive, so that the viewer sees only images generated by the apparatus and has no ability to see the outside world when wearing the device, thus providing virtual reality (VR) display. Alternately, varying degrees of visibility of the real world are provided with other designs, so that the generated images are superimposed on the real-world image as an augmented reality (AR) or mixed reality (MR) display or, in some way, used to complement the real-world visual content that lies in the viewer's field of view.

Wearable display devices offer considerable promise for providing information and displaying complementary imagery that can improve performance and efficiency in a number of fields and can help to enhance a viewer's understanding of visual content that lies in the field of view. In medicine and dentistry, for example, the capability to view image content that had been previously stored and, optionally, post processed, or is currently being acquired from another vantage point can help the practitioner to more accurately obtain detailed data that would aid diagnosis and treatment. Imaging data that is currently available only from high-cost 3-D imaging systems can be provided in a usable format for viewing on less expensive wearable image display equipment that allows the practitioner to have this information in an active clinical setting. Stereoscopic imaging, with its enhanced spatial understanding and improved presentation of relevant detail, can be particularly useful for those treating patients using medical imaging guidance or medical data, as well as for those skilled in other fields. In addition, even the presentation of non-stereoscopic 2-D image content, provided by eyewear that allows clear visibility of the primary or central vision visual field without obstruction, can be useful for various functions, including uses in patient monitoring as well as tele-medicine and in remote diagnostic or therapeutic guidance, as well as in industrial, consumer electronics, and other applications.

With many of the apparatus that have been proposed for wearable displays, the viewer is encumbered by the device in some way, due to device size, bulkiness and discomfort, component and image positioning, poor image quality, eye fatigue, and other difficulties. Although many clever solutions for providing a more natural viewing experience have been outlined, and a number of advances toward improved image quality have been introduced, the form factors for many of these solutions still make it difficult to win broad-based acceptance for these devices, particularly for long-term use or during work or recreational activity, as evidenced by lack of ready acceptance by consumers and industry for wearable display devices currently in the market. Their bulky size, poor image quality, obstruction and/or degradation of the real-world object scene, and awkward appearance are still considered to be significant factors in limiting the appeal of wearable imaging devices for many people.

Despite years of design effort and optimization, including integration of miniaturization and improved imaging technologies, designing wearable display apparatus with acceptable ergonomics and high image quality has proved to be a continuing challenge. One compromising aspect of head-mounted display (HMD) implementation relates to the requirement for a combiner in many design approaches. The combiner element, often a polarizing beam splitter, is the element that combines the electronically generated image of the display with the visible "real world" object scene or field of view. For the viewer, the combiner superimposes the generated digital image onto the outside world. The combiner frame is dimensionally constrained by the outline of the combiner plate or other element. Visibility through the combiner is degraded, reducing brightness of the field of view due to its inherent transmission loss and causing some scattering of light from bright external sources, often generating characteristic artifacts such as the so-called "dirty windshield" artifact and other negative effects.

Even where a combiner element is well-designed and carefully matched to device geometry, the combiner function, forming the superimposed augmented digital image, inherently reduces the see-through contrast for the real-world FOV. Further, a very bright augmented image can occlude portions of the primary or central vision field of view, even working against the purpose for which the augmented display is intended. As yet a further complication, conflicting brightness from the external object scene can cause difficulty in viewer perception of the augmented image. Attempts to mitigate brightness conflicts, such as boosting output power for the generated image above desirable levels or using an apodizer element in front of the combiner to reduce brightness of the external image, can be complex to implement and may often exacerbate the problem.

Conventional HMD designs compromise in the face of two conflicting goals:
  (i) Allowing see-through visibility of the real-world object scene, unhindered by optical combiner components that diminish brightness of the visual field and limit the FOV; and
  (ii) Forming an electronically generated image over a sufficiently wide FOV.

The schematic diagram of FIG. 1 shows how conventional HMD optical architectures compromise between (i) and (ii) above. FIG. 1 part a shows results of an apparatus that generates a virtual image, without see-through capability for the viewer. In a typical virtual reality (VR) design of this type, a large FOV F7a can be generated for an augmented image, such as 110 degrees wide. However, in order to provide the large-FOV augmented image, the real world is completely obscured; there is no visibility to the real-world object scene F8a.

FIG. 1 part b shows what is achieved by an alternate design using a prismatic display architecture with a side-arm support that allows some amount of see-through capability for the real-world object scene. The generated image has a small FOV F7b, such as 15 degrees wide, impractical for presenting sufficient textual, graphical, or image content suitable for healthcare or industrial applications. For reference, a primary or central vision FOV F5 is indicated.

FIG. 1 part c shows results of an alternate design that blocks a portion of the FOV F8c and hinders see-through for the balance of FOV F8c, while providing a sufficiently large generated-image FOV F7c such as 52 degrees wide.

Still other optical design approaches use a combiner prism, allowing even smaller generated image content FOV than is provided in FIG. 1 part b in most cases.

As the exemplary optical architectures of FIG. 1 show, conventional approaches, requiring some sort of combiner optics, have been unable to provide both an unhindered view of the real-world object scene and a generated image over a large FOV.

Workable solutions for wearable display devices that have a natural "feel" and that can be easily worn and used—and wherein the two sets of images, generated and real-world, do not conflict with each other—remain elusive. Thus, it can be appreciated that there is a need for a wearable device for single-eye or bilateral eye 2D or bilateral eye stereoscopic display that provides high image quality and is lightweight, inexpensive, easy to use, and ergonomically less invasive and cumbersome than conventional designs and provides enhanced display opportunities for viewing the generated image over a large field of view, without obstructing or diminishing the primary or central vision visual field.

SUMMARY

It is an object of the present disclosure to advance the art of near-to-eye display. Embodiments of the present disclosure provide a wearable viewing apparatus that provides suitable image quality from an electroluminescent array, with little or no impediment to viewer visibility over the field of view.

Embodiments of the present disclosure provide an eyepiece based on the optical "pancake" configuration, with improved performance and packaging that alleviate a number of optical, physiological, and ergonomic constraints of conventional head-mounted displays (HMDs). Embodiments of the present disclosure can provide a wearable viewing apparatus in an ultra-near-to-eye imaging arrangement, including embodiments with optical components disposed within the object focal length of the eye.

According to one aspect of the present disclosure, there is an optical apparatus wearable by a viewer and comprising:
an electroluminescent display that is energizable to emit image-bearing light along an optical axis;
a reflective polarizer in the path of light conveyed through an entry lens and configured to reflect light of a first polarization state and transmit light of a second polarization state that is orthogonal to the first polarization state;
a quarter wave plate (QWP) in the path of transmitted light of the second polarization state and disposed to impart a quarter-wave retardance to conveyed light;
a curved, partially reflective surface in the path of light conveyed through the QWP and treated to transmit a portion of incident light, and
an exit lens disposed to direct light conveyed from the curved, partially reflective surface to an exit pupil at a viewer eye box, with an eye relief of less than a focal length of an eye,
wherein the optical apparatus is configured for seating directly against the face of the viewer, below an inferior orbital rim,
wherein the optical apparatus is further configured to form an image from the image-bearing light that is peripheral to a primary field of view that lies along a horizontal line-of-sight of the viewer and extends at least 25 degrees above to at least 30 degrees below the horizontal line-of-sight,
wherein an image field of view of the formed image exceeds 40 degrees horizontally and 20 degrees vertically,
wherein the optical apparatus is configured to provide unobstructed visibility of the primary field of view while displaying the formed image.

These objects are given only by way of illustrative example, and such objects may be exemplary of one or more embodiments of the disclosure. Other desirable objectives and advantages inherently achieved by the disclosure may occur or become apparent to those skilled in the art. The invention is defined by appended claims.

BRIEF DESCRIPTION OF THE DRAWINGS

The foregoing and other objects, features, and advantages of the disclosure will be apparent from the following more particular description of the embodiments of the disclosure, as illustrated in the accompanying drawings. The elements of the drawings are not necessarily to scale relative to each other.

FIG. 1 is a schematic diagram that shows how a number of conventional optical designs allocate the viewer's FOV.

DETAILED DESCRIPTION

Figure 2A:
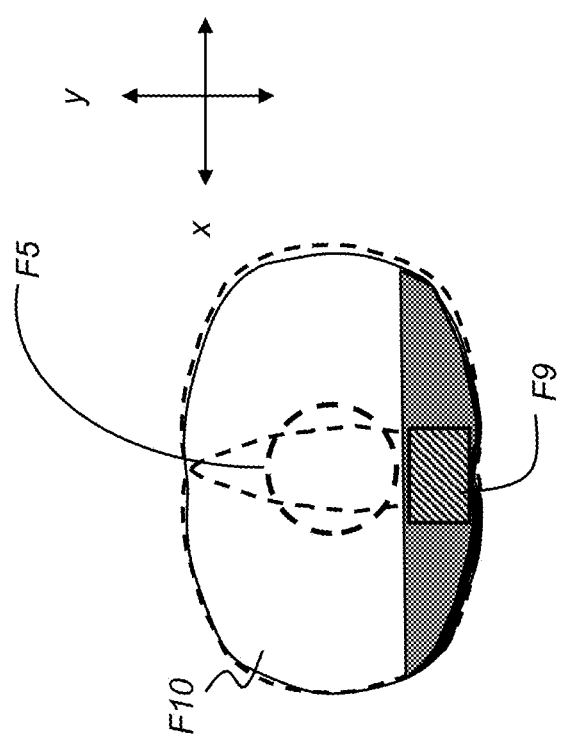
FIG. 2A is a schematic diagram that shows how the FOV is allocated using embodiments of the present disclosure.

Figures provided herein are given in order to illustrate principles of operation and component relationships along their respective optical paths according to the present disclosure and are not drawn with intent to show actual size or scale. Some exaggeration may be necessary in order to emphasize basic structural relationships or principles of operation. Some conventional components that would be needed for implementation of the described embodiments, such as support components used for providing power, for packaging, and for mounting, for example, are not shown in the drawings in order to simplify description. In the drawings and text that follow, like components are designated with like reference numerals, and similar descriptions concerning components and arrangement or interaction of components already described may be omitted.

Where they are used, the terms "first", "second", and so on, do not necessarily denote any ordinal or priority relation, but may be used for more clearly distinguishing one element or time interval from another. The term "plurality" means at least two.

In the context of the present disclosure, the term "energizable" describes a component or device that is enabled to perform a function upon receiving power and, optionally, upon also receiving an enabling signal.

In the context of the present disclosure, positional terms such as "top" and "bottom", "upward" and "downward", "above" and "below", and similar expressions are used descriptively, to differentiate directions or relative positions with regard to standard use of a wearable device by a standing or seated wearer and related aspects of vision fields, or different surfaces or views of an assembly or structure, and do not describe any necessary orientation of the assembly in an optical apparatus. The terms "upstream" and "downstream" as used herein have their conventional usage and refer to relative positions of light or light-conditioning or redirecting components as the light proceeds along an optical path.

In the context of the present disclosure, the term "coupled" is intended to indicate a mechanical association, connection, relation, or linking, between two or more components, such that the disposition of one component affects the spatial disposition of a component to which it is coupled. For mechanical coupling, two components need not be in direct contact, but can be linked through one or more intermediary components.

In the context of the present disclosure, the term "left eye image" describes a virtual image that is formed in the left eye of the viewer and a "right eye image" describes a corresponding virtual image that is formed in the right eye of the viewer. The phrases "left eye" and "right eye" may be used as adjectives to distinguish imaging components for forming each image of a stereoscopic image pair, as the concept is widely understood by those skilled in the stereoscopic imaging arts.

The term "oblique", where used in the present disclosure, describes an angular relationship that is not parallel or normal, that is, other than an integer multiple of 90 degrees. In practice, two optical surfaces are considered to be oblique with respect to each other if they are offset from parallel or normal by at least about +/−2 degrees or more. Similarly, a line and a plane are considered to be oblique to each other if they are offset from parallel or normal by at least about +/−2 degrees or more. Substantially parallel planes are parallel to within +/−2 degrees. Likewise, substantially parallel beams are parallel to within about +/−2 degrees.

In the context of the present disclosure, the term "about", when used with reference to a measurement, means within expected tolerances for measurement error and inaccuracy that are accepted in practice. Some reasonable tolerance must be allowed, for example, for measurement differences in determining the extent of a particular viewer's visual field, as it would vary from the measurement of one practitioner to another.

The term "exemplary" is used herein to mean "serving as an example, instance, or illustration." Any aspect described herein as "exemplary" is not necessarily to be construed as preferred or advantageous over other aspects.

In conventional use, the term "field of view" (FOV) broadly relates to the overall visual field that is available to a viewer with relatively normal eyesight under daylight viewing conditions. Field of view is typically measured in orthogonal horizontal and vertical directions.

Catadioptric pancake optics are characterized by thin lenses and have a curved partially reflective surface that focuses reflected light, with other surfaces that alternately transmit or reflect light. The light path within a catadioptric pancake optical system directs light in opposite directions within the optical system, typically by changes in polarization as the light is conveyed multiple times through wave plates or other suitable phase retarders.

Embodiments of the present disclosure address the conflicting requirements of unobstructed field of view for the real-world object scene and large field of view for the generated image content, described previously with reference to FIG. 1, by allocating the viewer FOV differently, as shown in the schematic diagram of FIG. 2A. The real-world object scene is fully within the primary or central vision FOV of the viewer, in FOV F10 as shown in FIG. 2A. FOV F10 is unhindered in the horizontal (x-axis) direction for viewing the real-world object scene. The unhindered region in the y-axis direction exceeds the boundaries of the primary or central vision FOV, as described herein.

Figure 2B:
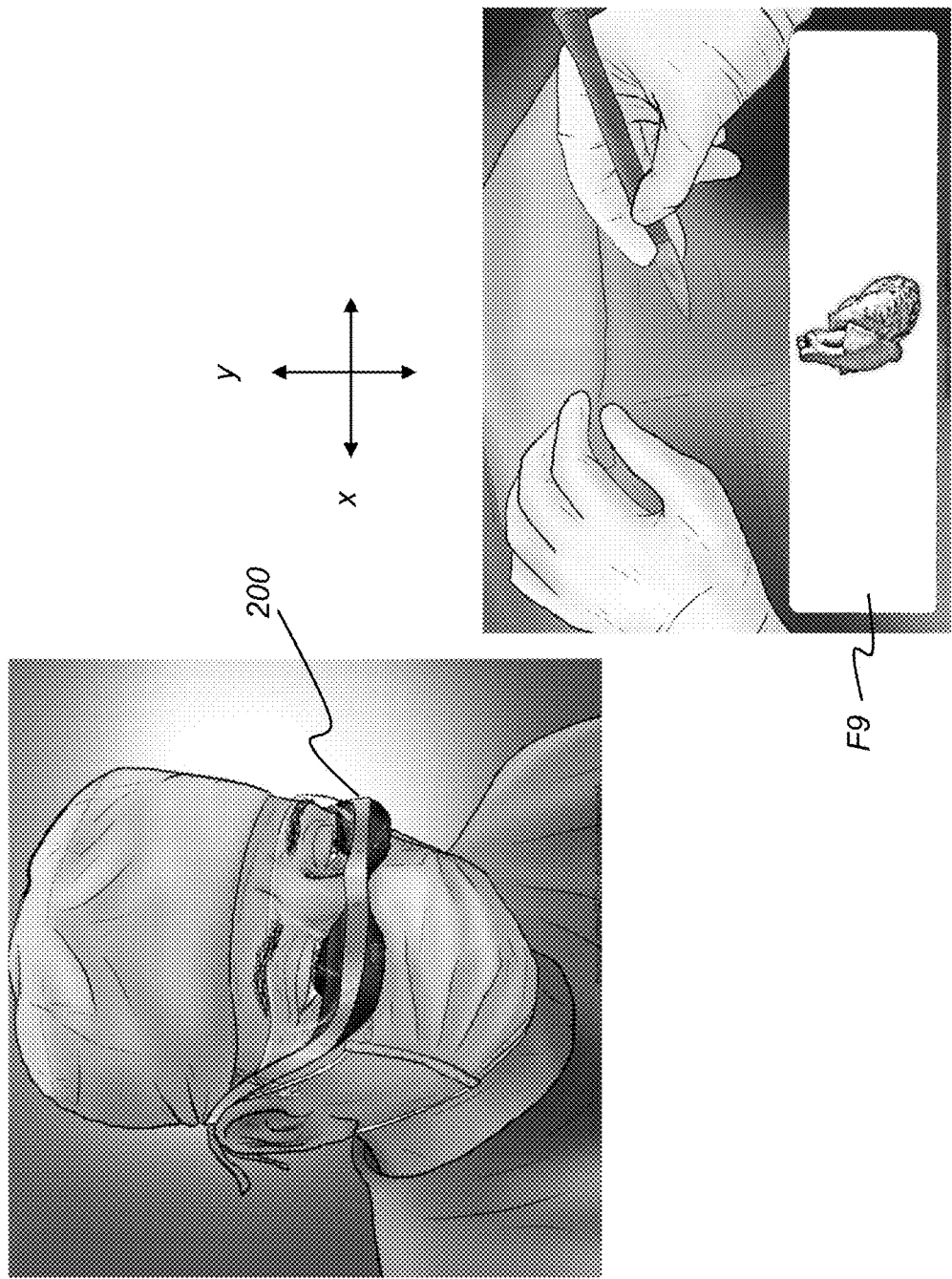
FIG. 2B is an exemplary illustration that shows the position of the generated FOV F9 formed by a near-to-eye imaging apparatus according to an embodiment of the present disclosure.

As shown in the exemplary illustration of the Applicant's near-to-eye imaging apparatus 200 in FIG. 2B, the viewer's eyes must turn downward from line-of-sight S1 in order to view the generated image that extends over an image field of view. When viewed as in this example, the generated image provides an image FOV F9 of at least 40 degrees in the horizontal direction and at least 12.5 degrees in the vertical, such as 20 degrees. In the embodiment shown, the generated image FOV is 45×12.5 degrees, for example.

In order to provide the re-ordered dual FOV arrangement shown in FIGS. 2A and 2B, the Applicant employs a small flat-panel display and a catadioptric pancake optics design with a curved, partially reflective surface configured to be disposed fully below a primary or central vision field of view of the viewer. The apparatus worn by the surgeon includes an optional eye shield that is disposed at a position above the Applicant's device.

Mapping the FOV

Figure 3A:
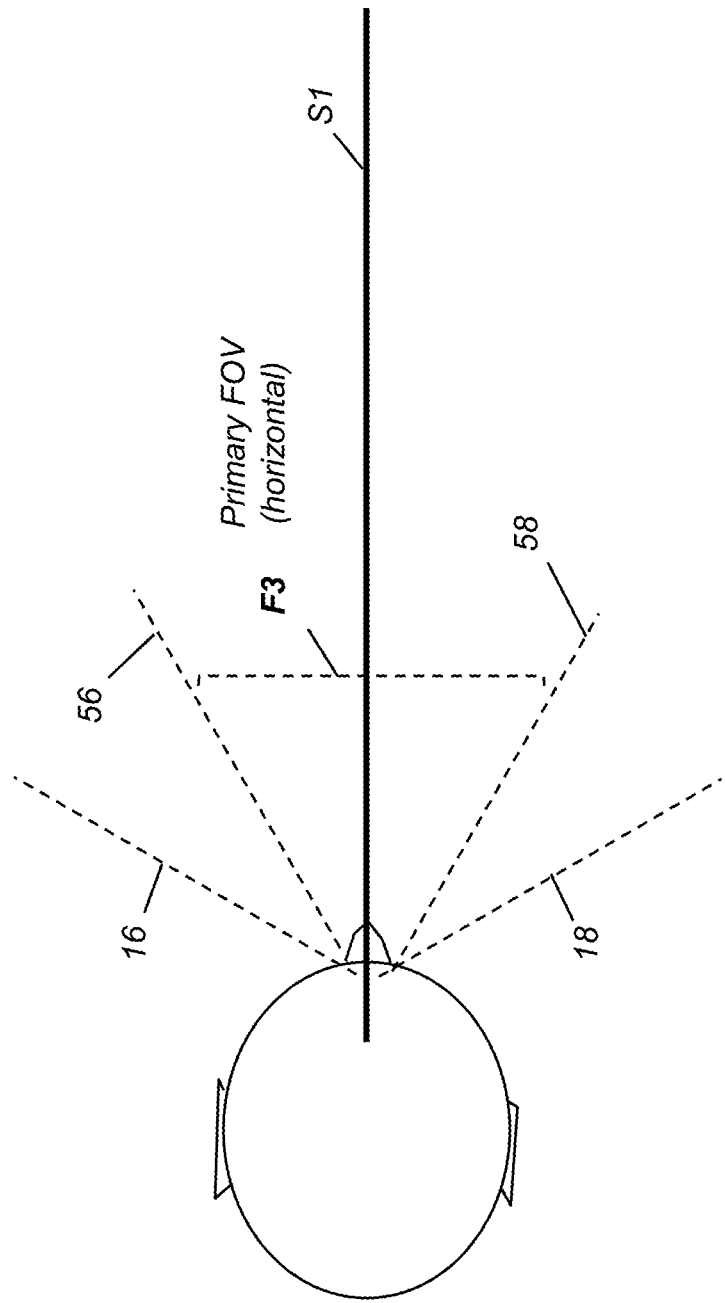
FIG. 3A is a schematic top view that shows the horizontal field of view of a viewer.

FIG. 3A shows how angular portions of the horizontal field of view are defined according to the present disclosure. Horizontal monocular visual limits are generally considered to be slightly in excess of 120 degrees, centered about a central horizontal line-of-sight S1, as bounded between lines 16 and 18. Symbol recognition in the horizontal FOV is generally considered to be in the area about +/−30 degrees from horizontal line-of-sight S1, shown as horizontal field F3 bounded between lines 56 and 58. This area generally corresponds to the primary FOV, as described subsequently.

Figure 3B:
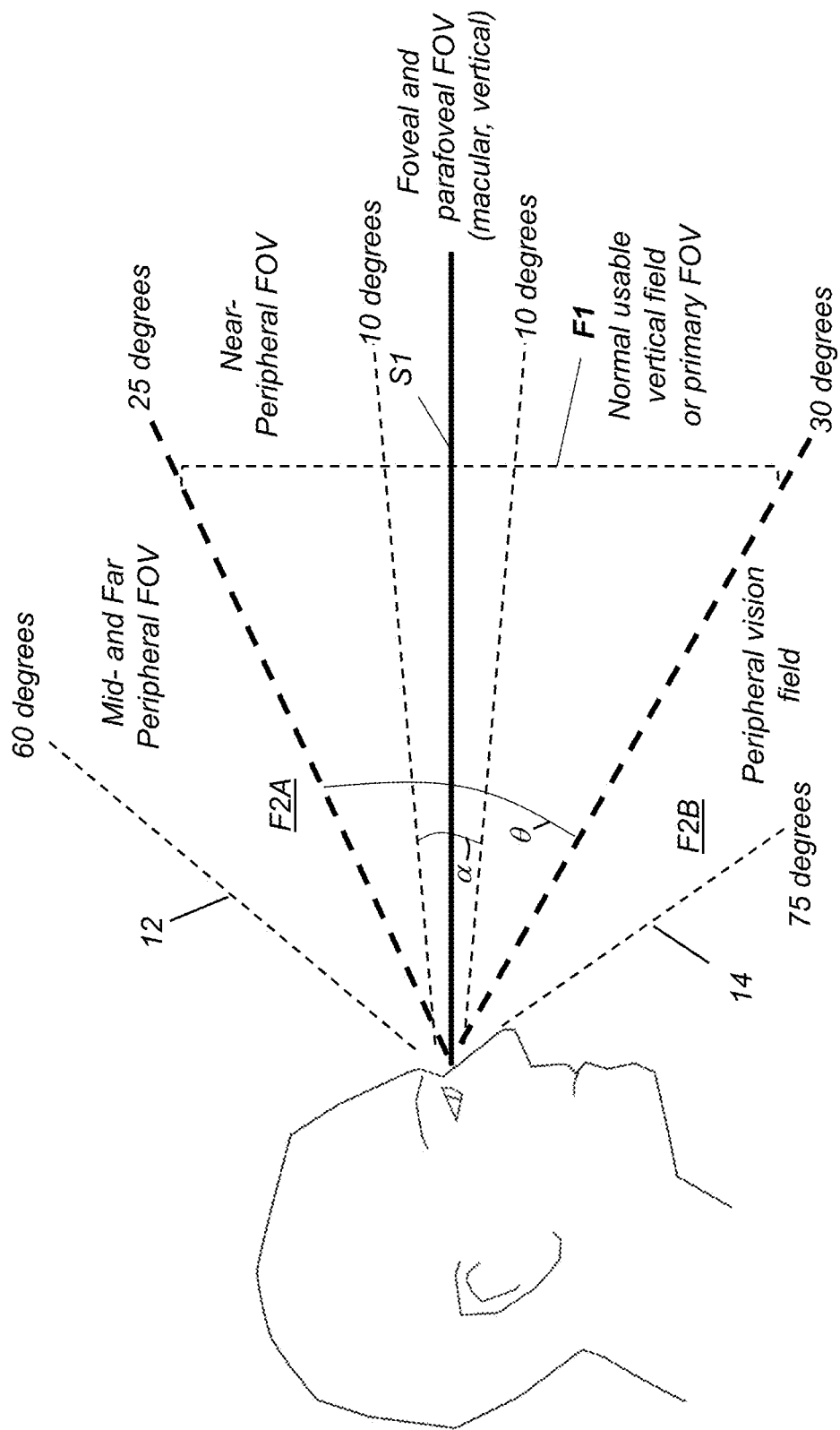
FIG. 3B is a schematic side view that shows the vertical field of view of a standing viewer looking forward, with normal and peripheral fields of view.

The vertical field of view, as this measurement is referred to herein, is shown schematically in FIG. 3B. A horizontal line-of-sight S1 is defined, extending generally at about 0 degrees to horizontal for a viewer who is standing, varying from true horizontal by no more than about +/−2 degrees. The horizontal line-of-sight has been defined as the primary position of the eyes with the retinal plane co-planar with the transverse visual head plane. This plane is defined by the principal retinal plane of the eye, the oculomolar nucleus and the calcimine cortex. It is defined as having a constant relationship to the canthomeafal line and perpendicular to Listing's plane.

The full vertical FOV for an adult viewer having normal vision generally extends from about 60 degrees above (expressed as +60 degrees) to about 75 degrees (expressed as −75 degrees) below horizontal line-of-sight S1 and defines the limits of the peripheral vertical FOV.

Primary Field of View (PFOV)

In the context of the present disclosure, the "primary field of view" (PFOV), equivalently referred to as the central vision field of view in the present disclosure, consists of the Foveal Visual Field, the Parafoveal Visual Field and the Near Peripheral Field of view as described subsequently, and corresponds to the following:
  (i) In the vertical direction, the normal "usable" vertical field of view (FOV) F1, typically considered to be defined within the range of angles from +25 degrees above to −30 degrees below the horizontal line-of-sight S1;
  (ii) in the horizontal direction, horizontal field F3, +/−30 degrees from horizontal line-of-sight S1, as described in FIG. 3A.

Different portions of the field of view can be distinguished from each other. Foveal vision, having the highest visual acuity due to retinal cone density, encompasses the central portion of the human visual field. This region uses approximately 50% of our optical pathway and serves the central 2-3% of the visual field. The macula of the retina subserves both the foveal and the parafoveal vision, providing high quality acuity and color vision as well, due to a high retinal cone concentration among the retinal rods, is thus generally considered to be at an angle α that is within no more than about +/−10 degrees of the line-of-sight. The approximately ten-degree foveal and parafoveal visual field is generally circular about the line-of-sight with about a four-inch diameter at a distance of 22 inches. As an approximation for an adult viewer, this region would be slightly smaller than the surface of a standard compact disc (CD) or digital video disc (DVD) held out at arm's length. Outside of this region, the visual field is considered to be peripheral and provides increasingly less visual information. Due to the retinal rod distribution of the human eye, the bulk of the peripheral visual information lies within about the first 20 degrees beyond the parafoveal field of view. The region defined by the foveal field of view, plus the parafoveal field of view, plus the closest peripheral field of view (that is, the near-peripheral field of view) corresponds closely to the primary field of view (PFOV) and is approximately oval in shape, with dimensions slightly greater in horizontal extent relative to the vertical. This region is regarded as an important functional visual segment, specifically evaluated by standardized visual field testing (e.g., Central Humphrey Visual Field).

Figure 3C:
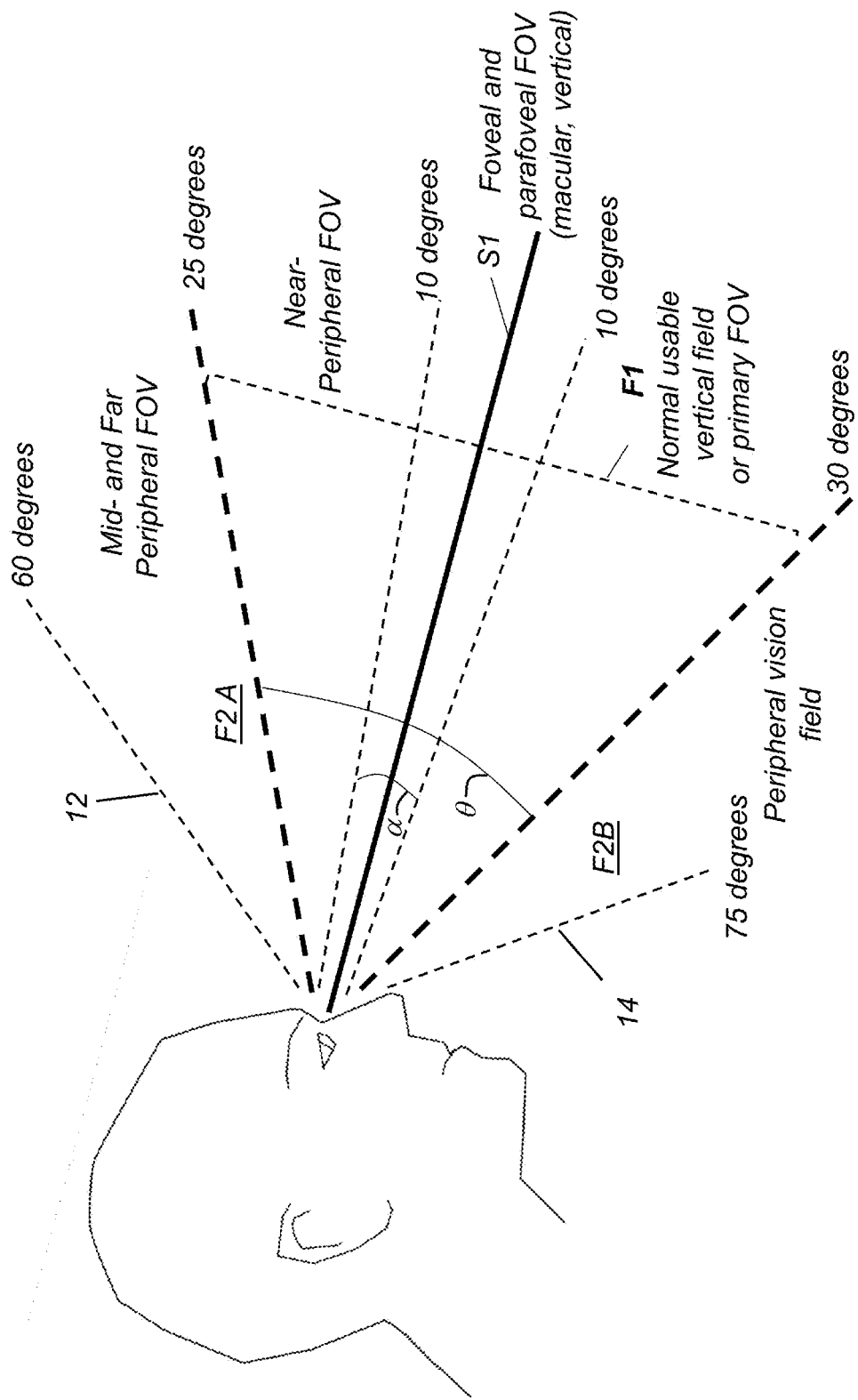
FIG. 3C is a schematic side view that shows the vertical field of view of a seated viewer looking forward, with normal and peripheral fields of view.

For the embodiments described herein, the normal usable vertical FOV F1 is larger than the foveal/parafoveal FOV and less than the entire peripheral FOV, corresponding to the Primary or central vision FOV, and is defined as being within the vertical range from about +25 to −30 degrees of the line-of-sight. FOV F1 is considered generally to be within the limits of color discrimination, which degrades substantially for vision angles increasingly outside this region. FIGS. 3B and 3C show the lower vertical portion of the primary field of view PFOV F1, below forward horizontal line-of-sight S1; vertically, PFOV F1 is bound within an angle θ about horizontal line-of-sight S1. The region that lies within the +60 to −75 degree vertical visual limits of the viewer but in the regions outside vertical FOV F1 is considered to be the "mid- or far-vertical peripheral vision" field or, simply, a peripheral vertical field, shown with upper and lower portions F2A, F2B, respectively.

FIG. 3B shows the two portions of the vertical peripheral vertical field, an upper portion F2A above the line-of-sight S1 and a corresponding lower portion F2B below horizontal line-of-sight S1. Upper portion F2A lies between about 60 degrees from line-of-sight S1, shown by a line 12, and the upper definition of primary or central vision FOV F1 which is about 25 or more degrees above line-of-sight S1. A lower portion F2B of the peripheral vertical field lies beyond FOV F1 which extends down to about −30 degrees and about −75 degrees from line-of-sight S1, shown by a line 14. Thus, lower portion F2B of the peripheral vertical FOV lies between about −30 and −75 degrees relative to horizontal light of sight S1.

Line-of-sight S1 generally tracks the viewer's head position. For a seated viewer, for example, the reference line-of-sight S1 tends to shift downwards to about 15 degrees from horizontal. All of the other vertical coordinates and angles that define foveal, parafoveal, near-, mid-, and far peripheral fields shift accordingly, as is shown schematically in FIG. 3C. In the context of the present disclosure, the reference line-of-sight S1 for vertical fields is considered to correspond to the horizontal for a standing viewer, tilted to about 15 degrees from horizontal for a seated viewer. This line-of-sight S1 is termed a horizontal line-of-sight as a reference in the description that follows.

Figure 3D:
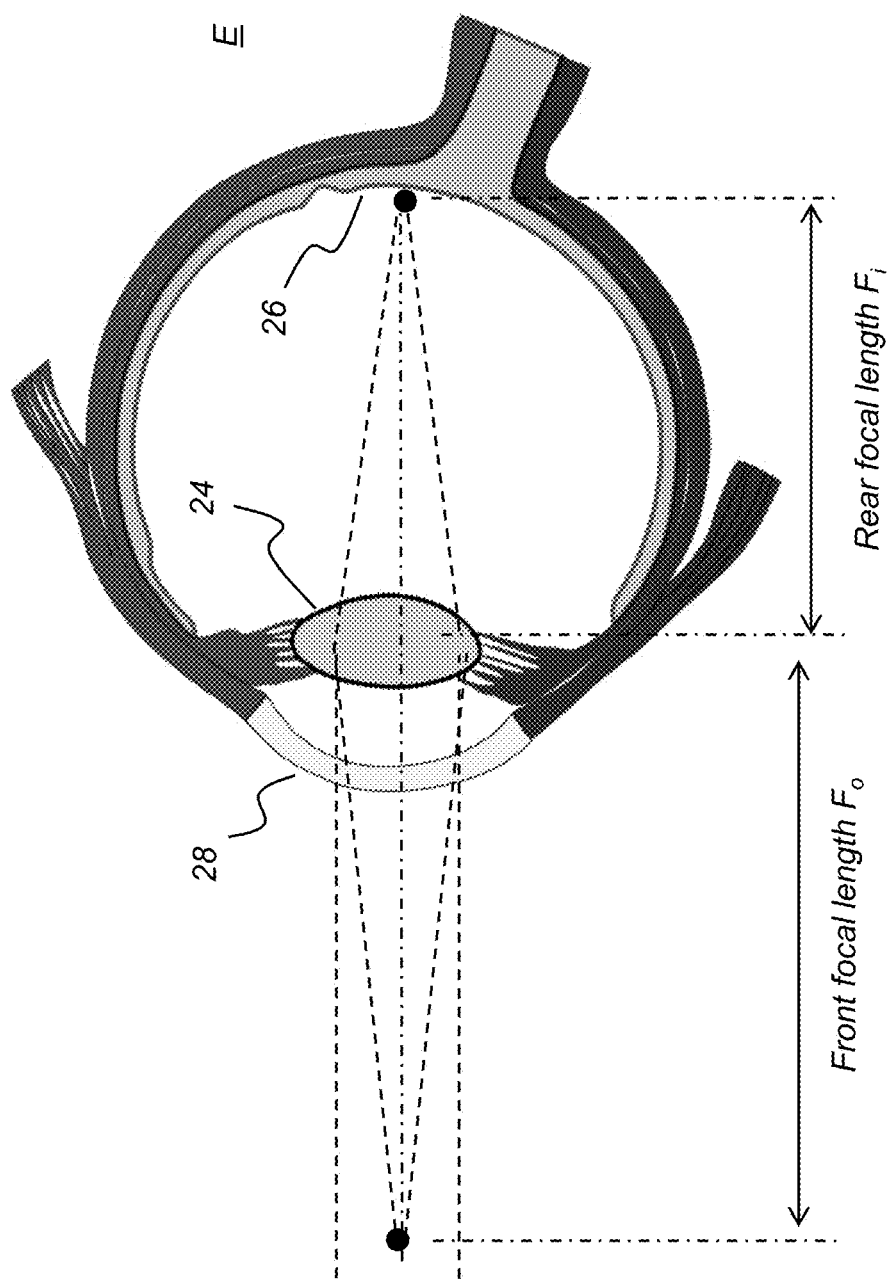
FIG. 3D is a cross section view showing portions of the eye and object and image focal lengths of the eye.

As shown in the cross-sectional side view of FIG. 3D, the optics system of the human eye E, considered as an optical component primarily with lens 24 and cornea 28, has focal lengths that are determined by the geometry of the lens 24, cornea 28, and the surrounding medium. For an adult with normal, uncorrected vision, the eye E has a front focal length $F_o$ of about 16.7 mm. The normal, uncorrected adult human eye E has a rear focal length $F_i$ of about 22.3 mm. The front focal length $F_o$ is in air; the rear focal length $F_i$ is within the refractive liquid medium of the eye E, which effectively shortens the actual optical distance dimensions as shown in FIG. 3D. The iris, which forms the pupil of the eye as an imaging system and limits the aperture to less than about 7 mm, is not shown for clarity in FIG. 3D. Under bright light conditions, the pupil diameter controlled by the iris averages only about 2.5 mm. A "normal" eye can focus parallel light rays from a distant object onto the retina 26, with the parallel rays considered to be at infinity, to a point on the retina 26 at the back of the eye E, where processing of the visual information begins. As an object is brought close to the eye E, however, the muscles change the shape of the lens 24 so that rays form an inverted real image on the retina 26. The theoretical region of focus in front of the lens is the object image zone.

Figure 3E:
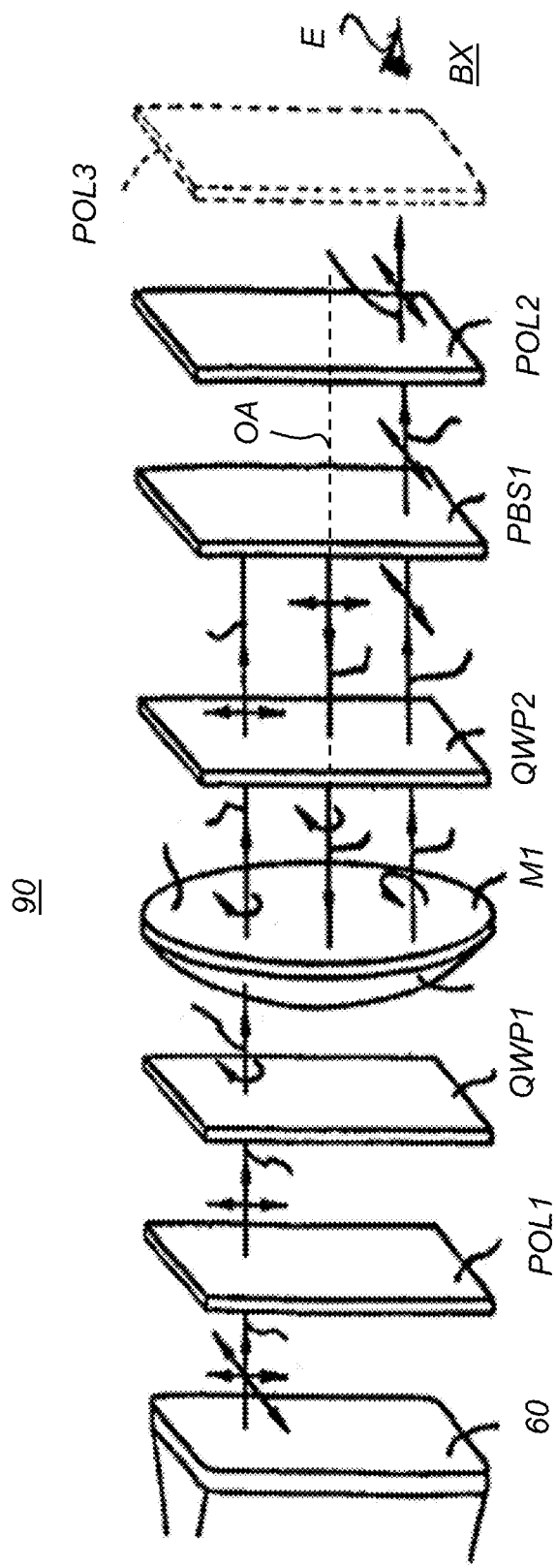
FIG. 3E is a schematic diagram showing a conventional "pancake" design for an eyepiece of an imaging apparatus.

The schematic diagram of FIG. 3E shows an exploded view of a conventional catadioptric "pancake" optical system 90 of an eyepiece intended for forming an image for a viewer at an eye box BX. The optical system uses polarization for folding the light path of the modulated beam back upon itself and employs reflective focusing optics with a curved mirror M1. Curved mirror M1 defines an optical axis OA. The conventional image source 60 is a cathode-ray tube or other emissive surface that provides a two-dimensional (2-D) image field. Image source 60 is positioned at the front focal surface of a curved mirror M1. A collimated beam is provided to the eye E from every field point.

Catadioptric pancake system 90 works as follows: unpolarized light of a modulated beam from the CRT or other image source 60 is linearly polarized by polarizer POL1 and converted to a left-hand circularly polarized light by quarter wave plate QWP1. The light goes through partially reflective curved mirror M1; half of the light is reflected and lost. Mirror M1 is considered to be "partially transmissive" or "semi-transmissive" or "semi-transparent", so that it transmits at least about 35% of the incident light from QWP1, preferably transmitting 50% of the incident light and reflecting 50% for peak efficiency. A partially transmissive or semi-transparent curved mirror does not transmit more than 65% of the incident light.

The transmitted circularly polarized light goes through another QWP2 to become vertically linearly polarized light and is directed to a reflective polarizer, polarization beam splitter PBS1, which reflects most of the light back towards the curved mirror M1. Reflected light from PBS1 transits QWP2 again to become right-hand circularly polarized. The curved mirror M1 again reflects about half of the light and loses the other half from transmission. The reflected polarized light from mirror M1 is now left-hand circularly polarized and is converted by quarter wave plate QWP2 into horizontally polarized light, passing through the reflective polarizer or polarization beam splitter PBS1 through POL2, and through an optional cleaning polarizer POL3 into the eye E of the viewer. Each transit of the light through a quarter wave plate (QWP) retards the phase by a 45-degree shift, changing polarization state.

In spite of seemingly complex polarization and light-directing mechanisms, pancake optics function well. One penalty with pancake optics relates to relative inefficiency; there is considerable loss of more than 75% of the light originally generated from the light source 60. This inefficiency and substantial loss of light makes the pancake optical configuration poorly suited for many applications with conventional sources of modulated light such as OLED and other sources.

As FIG. 3E illustrates, pancake optics require a number of partially transparent surfaces, using mirrors and other devices that must both transmit and reflect light along optical axis OA. The combined components along the optical path can obstruct visibility along a line of site extending through the pancake optics, rendering such an arrangement an unlikely solution for see-through applications.

An embodiment of the present disclosure addresses this problem of object field visibility by the particular placement of pancake system 90 components with respect to the line-of-sight S1, as shown in FIGS. 3A-3C. The optical components lie just within the vertical peripheral field of view and do not obstruct the primary field of view.

Figure 4B:
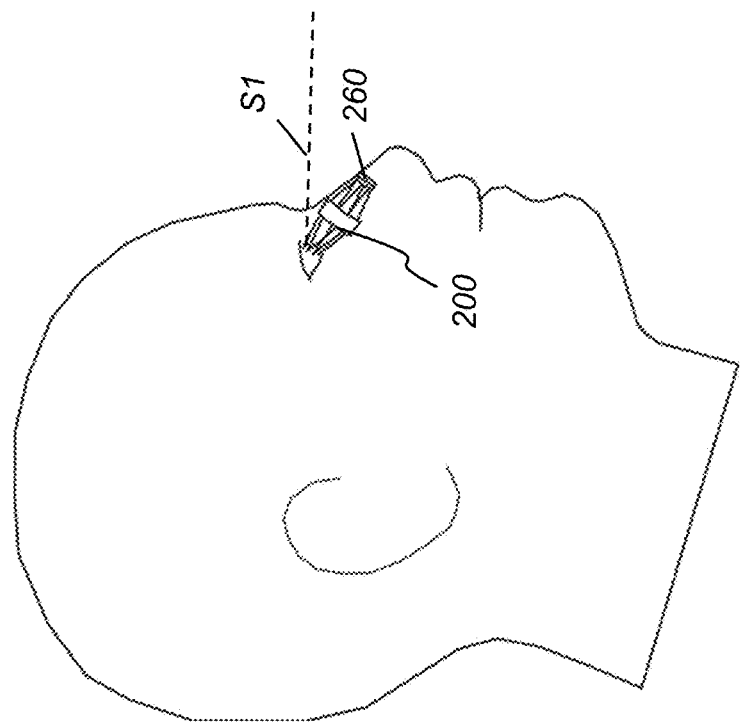
FIGS. 4A and 4B show front and side views, respectively, of a near-to-eye imaging apparatus according to an embodiment of the present disclosure.
Figure 4A:
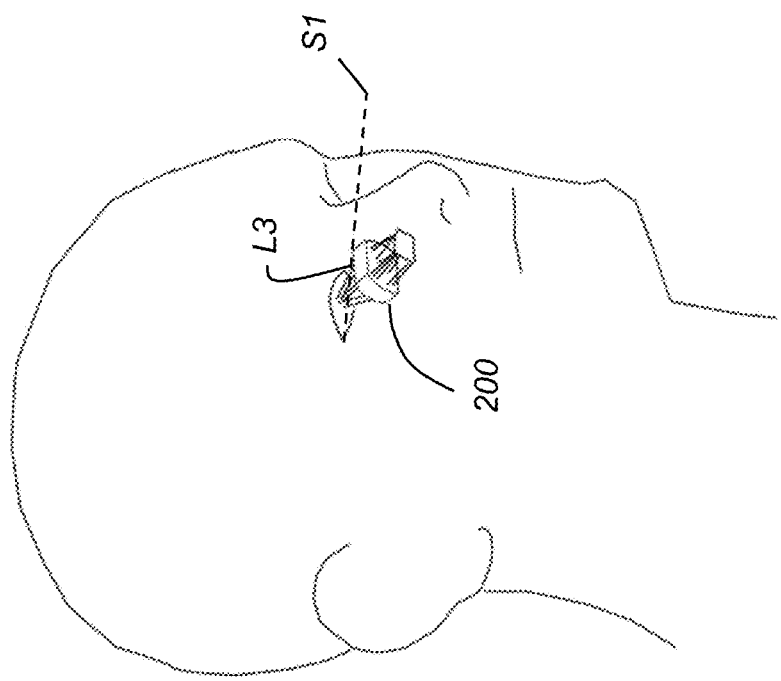

FIGS. 4A and 4B show front and side views, respectively, of near-to-eye imaging apparatus 200 according to an embodiment of the present disclosure. Size and placement of apparatus 200 allow its use as a wearable imaging device that does not obstruct the forward field of view. Apparatus 200 is disposed along the cheek surface of the viewer, with at least a portion of apparatus 200, such as image source 260 or exit lens L3, within the object focal length of the eye, generally defined as 16.7 mm from the eye. Given this disposition, the line-of-sight S1 of the viewer is unobstructed by apparatus 200 or by any of its support components, frames, or connectors. Unobstructed visibility of the real-world object scene in the horizontal direction, and over the primary field of view in the vertical direction as described herein, can thus be provided.

Since the disclosed system is small and rests on the viewer's face below the inferior orbital rim, the system does not block the primary FOV of the viewer. Apparatus 200 thus forms a "see-above" or "see-around" system without a combiner. Occlusion by the frame only affects the lower periphery of the real-world FOV, below the primary field or PFOV of the viewer. When looking ahead normally, above apparatus 200, the primary PFOV of the viewer is unhindered. At the level of the line-of-sight S1, there is no obstruction along the horizontal axis; because there is no combiner, the real-world view is unhindered. There is no combined or cross-image degradation, since the generated and real-world images are not superimposed over the primary PFOV. Further, because a combiner is not used, there is no scattering artifact, such as "dirty windshield" substructures often visible from combiner surfaces.

In earlier work on near-to-eye displays, brightness and efficiency trade-offs have made it difficult to take advantage of the benefits of pancake design. Even OLED image sources, demonstrating high brightness of up to thousands of NITS (candelas per $m^2$), are not able to provide sufficient light under bright sunlight conditions when using optical pancake design approaches.

Recent developments with microLED arrays provide more promise for achieving the needed brightness levels. MicroLED arrays, capable of brightness in excess of 5,000 NITS may replace OLED image sources in many RGB imaging applications. Due to high output brightness, MicroLEDs may effectively eliminate problems caused by low efficiency transmission for pancake and other optical arrangements. MicroLEDs may also be able to provide sufficient display resolution for generating images of suitable quality for wearable near-to-eye display device applications.

In spite of promising gains in brightness, however, there are a number of technical and ergonomic hurdles that must be overcome in order to provide a satisfactory display output using catadioptric pancake optics for near-to-eye display. These include:

(i) maintaining a large unobstructed primary FOV of at least from +25 degrees above to −30 degrees below the horizontal line-of-sight S1, while providing a digital image that can be readily viewed without turning the viewer's head or using hands for manual adjustment;

(ii) providing an ocular having a low-profile form factor, wherein the optical system of the ocular for each eye can be seated comfortably against the head and face of the viewer, without obstructing the primary FOV, in contrast to conventional solutions that require see-through combiner optics or a frame;

(iii) providing a very short eye relief of less than 16 mm within the object focal length of the eye, to allow compact size and stability with movement;

(iv) maintaining a useful field of view that is comparable to that currently provided by a smart phone at typical reading distance of 12-16 inches or filling the primary field of view, approximately +/−20 to 30 degrees horizontal and vertical.

(v) Allowing full view of the visual field (the real-world object scene) over the primary FOV without contrast degradation from the superimposed augmented image;

(vi) Displaying the augmented image with minimal contrast degradation from the real-world object scene;

(vii) using an electroluminescent source that is smaller in size than the ocular lenses, with a corresponding reduction in size and weight for the associated optical system;

(viii) providing stereoscopic imaging with improved focal accommodation, including the capability to adjust focus synchronously with the digital image content, forming multiple fields of focus and helping to alleviate or prevent viewer eyestrain; and (ix) providing both a small device and a large display field using telecentric light that does not alter magnification with a change in focus.

Unlike conventional approaches that employ large-panel electroluminescent or emissive displays in order to obtain sufficient FOV, the Applicant's solution is designed for near-to-eye configurations, with portions of the optical system disposed within the focal length of the viewer's eye, that is, within 16.7 mm of the surface of the viewer's cornea. The Applicant's optical system shapes the emitted light from the microLED display using a field lens to provide telecentric light to the optical system.

The Applicant's system employs a catadioptric pancake optical arrangement as an ocular or eyepiece for an imaging system that provides a source image from a microLED array. An eyepiece is an optical system having an entrance pupil located outside of the system. The Applicant system conditions the emitted light from the microLED array to maintain telecentric output or, preferably, nearly telecentric output.

Catadioptric pancake optics, although disadvantaged for size and loss of brightness in many applications, inherently offer a high level of symmetry about the optical axis, with the concomitant advantages of small off-axis aberration and excellent field curvature control. Various solutions have been proposed for using pancake optics with larger-scale display apparatus that are mounted within frames or fitted into other headgear worn by the viewer. These solutions generally occlude the whole visual field. In order to adapt catadioptric pancake optics for near-to-eye applications, however, the Applicant's optical design scales the pancake optics configuration to provide a highly compact optical system, taking advantage of its multiple folds due to polarization manipulation and its use of a mirror as the dominant power component. Unlike many conventional pancake optics-based solutions, the Applicant design allows use of a positive field lens at the image source, helping to simplify the configuration of other optical components in the system. The resulting compactness achieved by the Applicant design allows use of a very small display component, such as a microLED array, for providing a generated image with a relatively large field of view and further enables the look-around form factor.

FIGS. 4A and 4B show the wearable arrangement of a near-to-eye imaging apparatus 200 according to a preferred embodiment of the present disclosure. Size and placement of apparatus 200 allow its use as a wearable imaging device that does not obstruct the primary or central vision field of view, as defined previously. Apparatus 200 is disposed along the cheek surface of the viewer, with at least a portion of apparatus 200, such as image source 260 or exit lens L3, within the object focal length of the eye, generally defined as 16.7 mm from the eye. Given this disposition, the line-of-sight S1 of the viewer and the primary FOV are unobstructed by apparatus 200, allowing full, unobstructed view of the real-world object scene in the horizontal direction along the normal line-of-sight S1 and visible only in a lower portion of the peripheral vision field F2B (FIG. 3B). Unobstructed visibility of the real-world object scene can thus be provided.

Using techniques commonly referred to as "pass through" or "clear through" optics, digital video images of the surrounding real-time environment, obtained via separate video camera components (not shown), can be relayed to electroluminescent display 260 and added to, superimposed upon, and/or co-registered to other generated digital content so that both the real-world object scene and the generated digital content may be seen simultaneously. Meanwhile, the entire display still lies within the mid- and far-peripheral vertical field so that the viewer can also see an unobstructed view of the real-world object scene over the primary FOV, when looking above the generated display content. This pass-through technique, adapted in whole or in part, is one way to provide an augmented or mixed reality or "extended reality" experience for the user. Clear, unobstructed visibility provides no obstacles to real-world light and is thus particularly advantageous over solutions that use a combiner for image content, such as by employing a prism or obliquely slanted beam splitter.

Embodiment #1

Figure 5A:
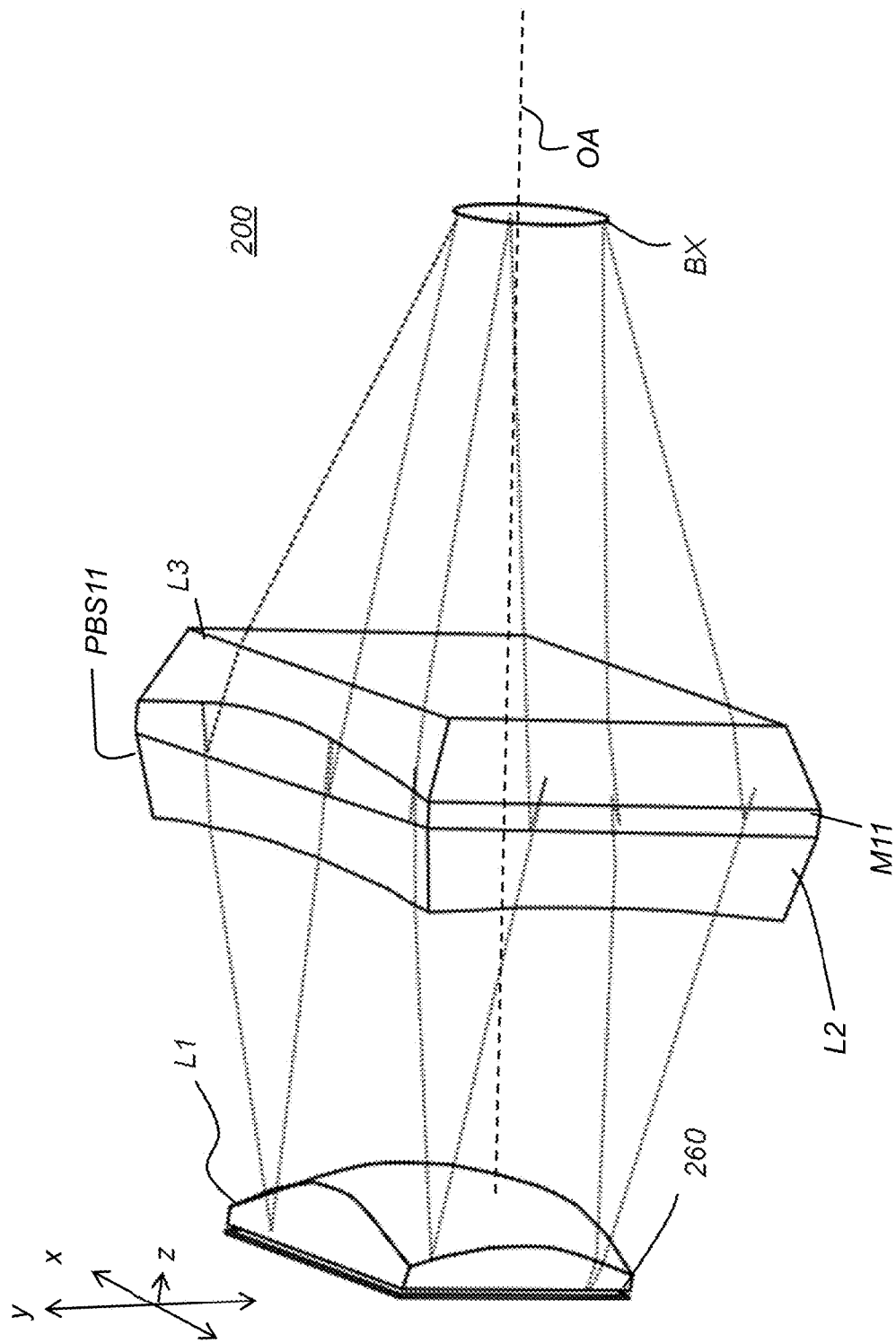
FIG. 5A is a perspective view that shows components of a wearable imaging apparatus for near-eye viewing according to an embodiment of the present disclosure.
Figure 5B:
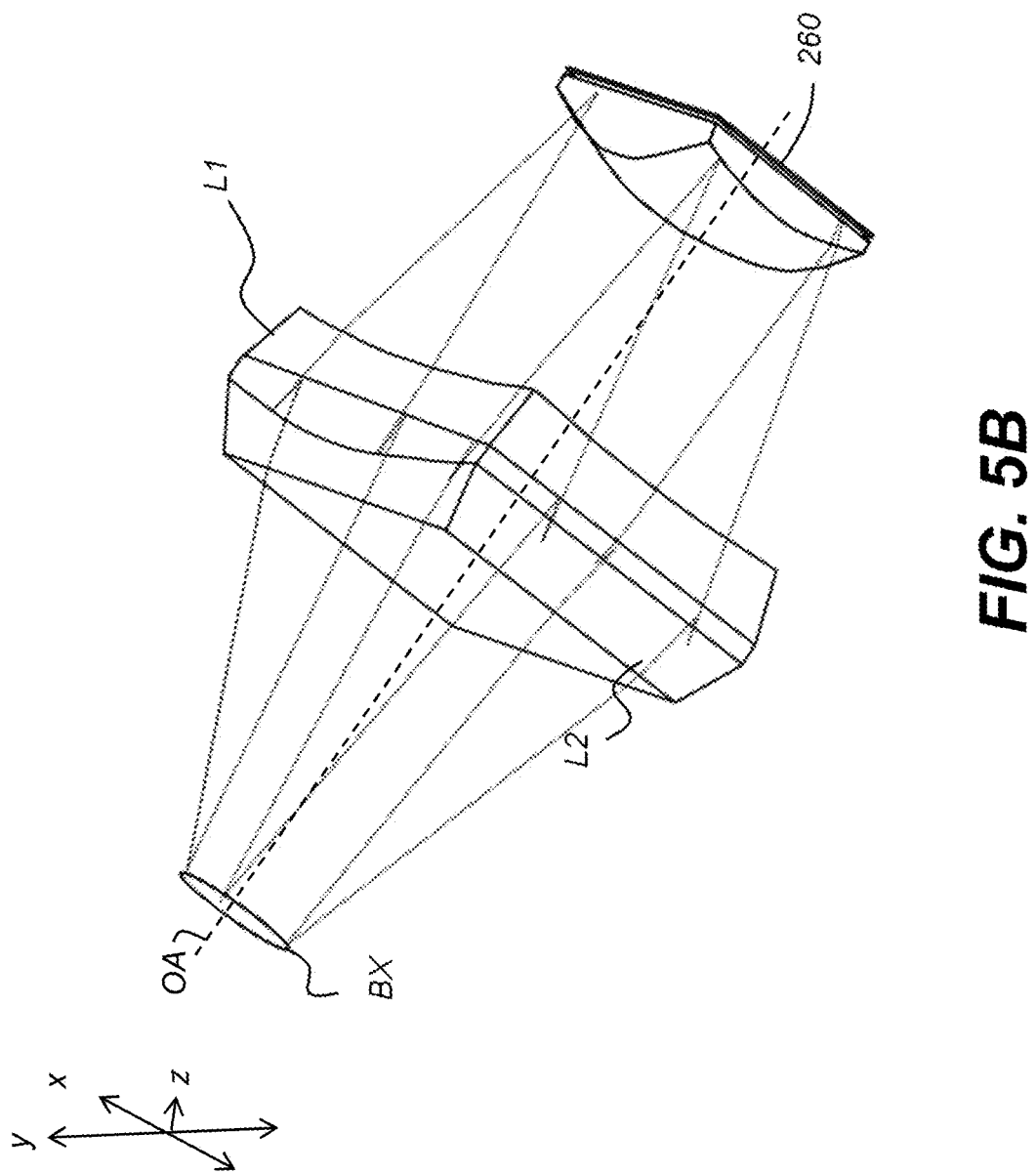
FIG. 5B is a perspective view that shows components of a wearable imaging apparatus for near-eye viewing as viewed by the wearer according to an embodiment of the present disclosure.
Figure 5C:
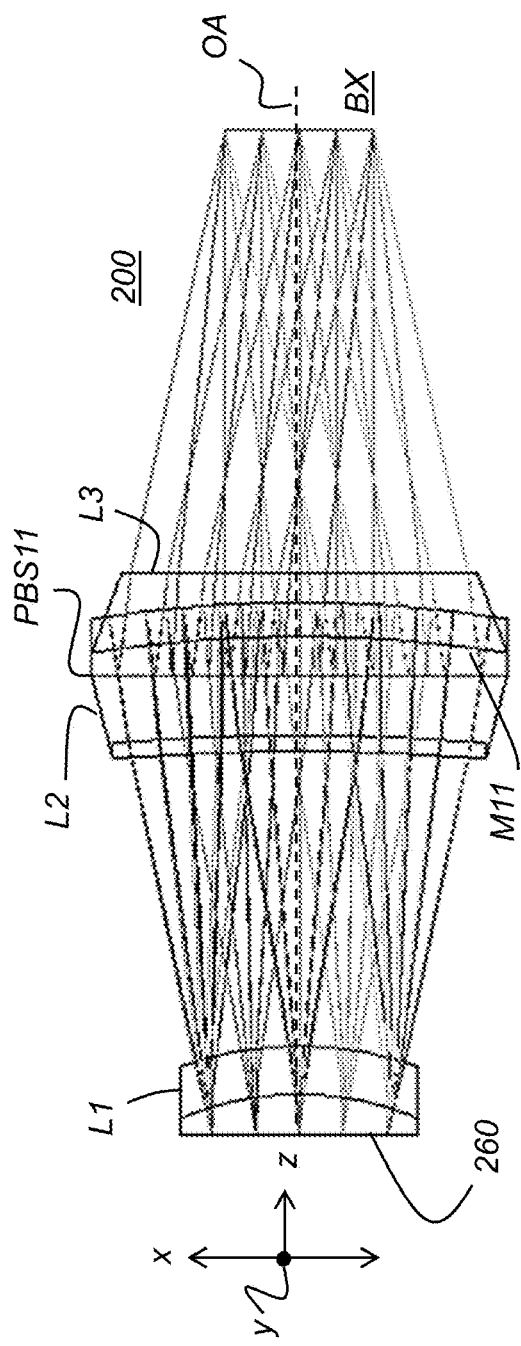
FIG. 5C is a perspective view that shows components of an imaging apparatus for near-eye viewing in horizontal cross section according to an embodiment of the present disclosure.
Figure 5D:
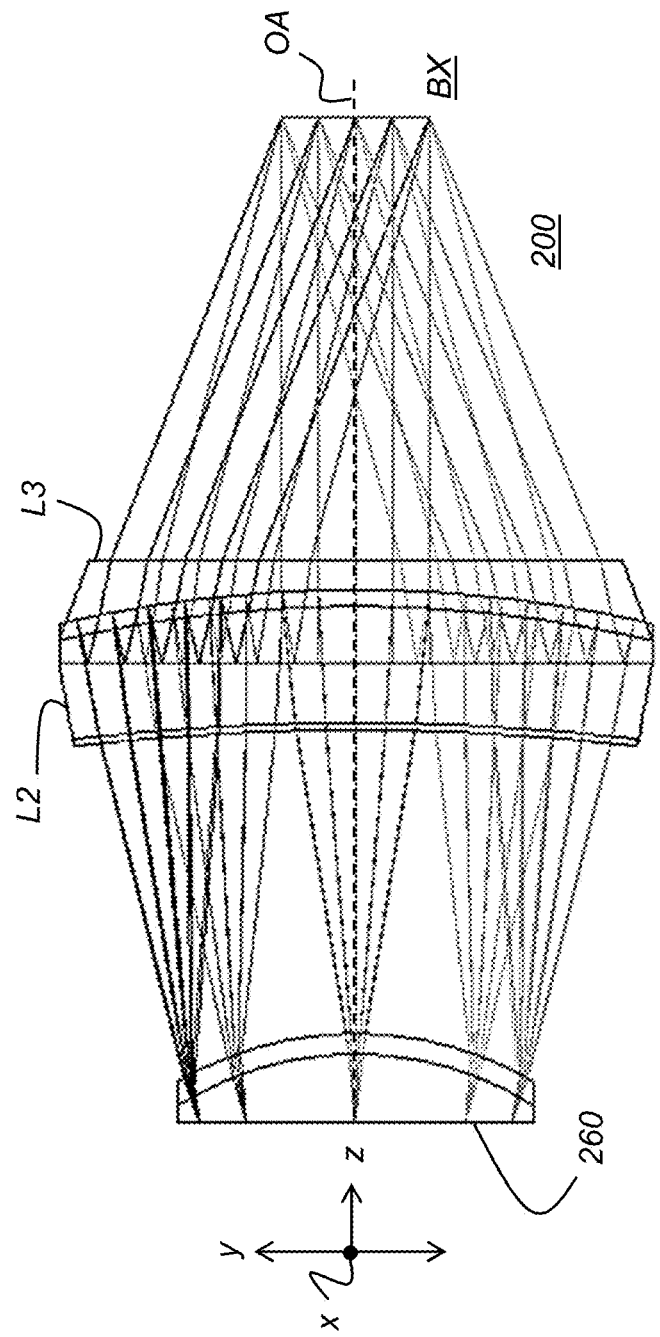
FIG. 5D is a perspective view that shows components of an imaging apparatus for near-eye viewing in vertical cross section according to an embodiment of the present disclosure.

The perspective views of FIGS. 5A and 5B and side cross-sectional views of FIGS. 5C and 5D show the design form of the Applicant's imaging apparatus 200 for near-to-eye viewing, using image-bearing light emitted from an electroluminescent image source 260. Image source 260 is linearly polarized, having a first polarization state, such as vertical polarization. This light is directed through an optional field lens L1 and then to an input entry lens L2. The light is conveyed to a reflective polarizer PBS11 that transmits the vertically polarized light and reflects horizontally polarized light (or, conversely, where the image source 260 generates horizontally polarized light, transmits horizontally polarized and reflects vertically polarized light). The transmitted modulated light is conveyed through a quarter wave plate QWP11, which provides the corresponding phase retardance, and to a curved mirror M11 that is partially reflective (nominally 50% reflective), partially transmissive (nominally 50% transmissive).

Mirror M11, concave to incident light from source 260, serves as a type of beam splitter and focuses the modulated beam of light that is reflected upon initial incidence. Reflection of a portion of the light from mirror M11 reverses the circular polarization of the light, which transmits through the quarter wave plate QWP11 when traveling in the opposite direction. Light reflected from mirror M11 has changed circular polarization and is reflected from polarizer PBS1 and back through quarter wave plate QWP11. A portion of this light travels through curved mirror M11 and transmits through for cleaning by optional circular polarizer POL2. This cleaning helps to remove any leaked light having the orthogonal polarization that could cause image ghosting. The collimated light from imaging apparatus 200 is directed to eye box BX and to the eye of the viewer. The light is ultimately directed to the retina 26 of the viewer (FIG. 3D), forming an image as shown.

For embodiments of FIGS. 5A through 5D, the input surface of lens L2 and output surface of lens L3 can be aspheric. The optical design can be telecentric at image source 260, the object of the optical system. For object-telecentric optics, any principal ray from the object is conveyed through the optical system in parallel with the optical axis, parallel to within 0.1 radians.

Either or both Polarizers PBS1 and POL2 can be, for example, wire grid polarizers, such as polarizers from Moxtek Inc., Orem, Utah.

Embodiment #2

The embodiment shown in FIGS. 5A through 5D can also be used with curvature of mirror reversed along the optical axis OA, wherein the light from electroluminescent image source 260 is circularly polarized. The reflective polarizer PBS11 would follow the semi-transparent mirror M11 in the optical path. Light incident on polarizer PBS11 the second time would then be collimated and directed along optical axis OA.

Those skilled in the imaging arts can appreciate that additional variations are possible using the curved mirror M11 as reflective polarizer and using a flat, semi-transparent mirror.

Figure 6:
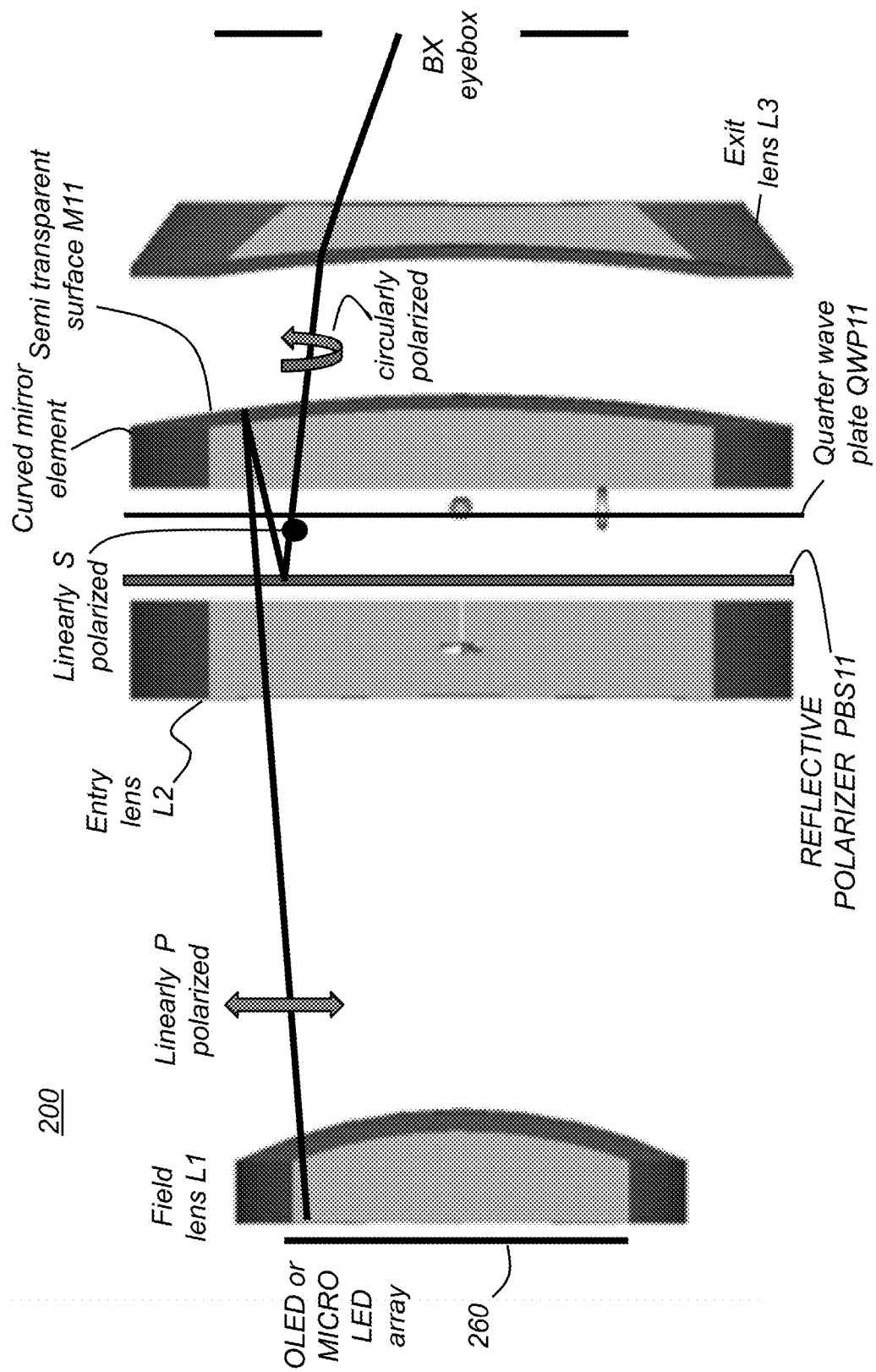
FIG. 6 is an exploded side view schematic that shows beam propagation and respective polarization states as used in an embodiment of the present disclosure.

FIG. 6 is an exploded view schematic of apparatus 200 for clarification of polarization states when linearly polarized light is generated or otherwise provided from image source 260. The generated light propagates along the image path from image source 260 through the field lens L1, entry lens L2, and then through polarizer PBS11 to the semitransparent surface of mirror M11, back to the polarizer PBS11 for reflection towards the semitransparent surface. The light exits through the exit or output lens L3 and to eye box BX.

Figure 7:
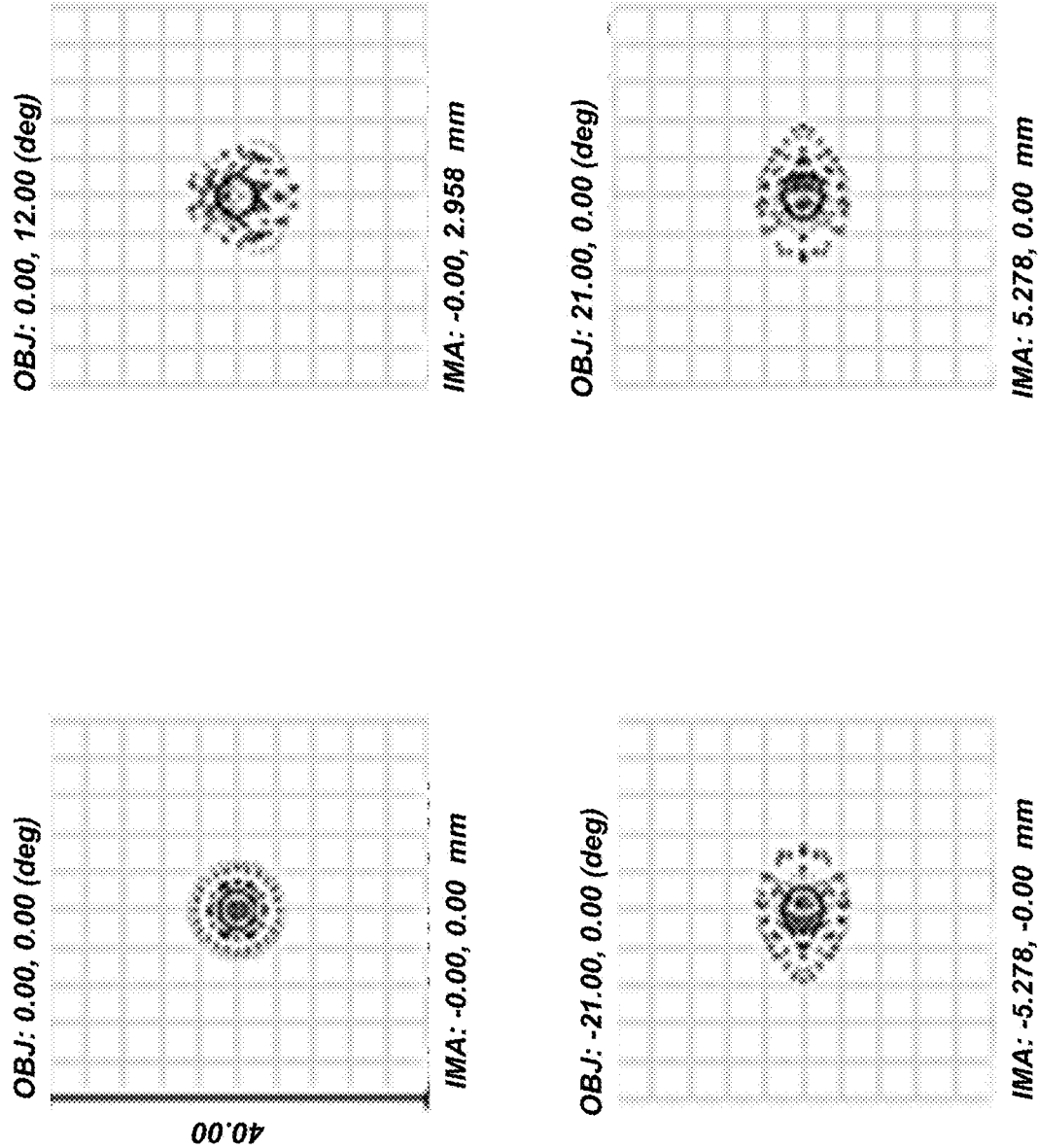
FIG. 7 shows representative RMS spot size measurements of the system for different field angles.

FIG. 7 shows representative RMS spot size measurements of the system for different field angles. Following standard practice, spots are derived at the image source plane with collimated beams coming from the direction of the eye at the different field angles. Spot size measurements show spots less than 5 microns, indicating excellent optical performance, characteristic of pancake lens symmetry about the optical axis.

Figure 8:
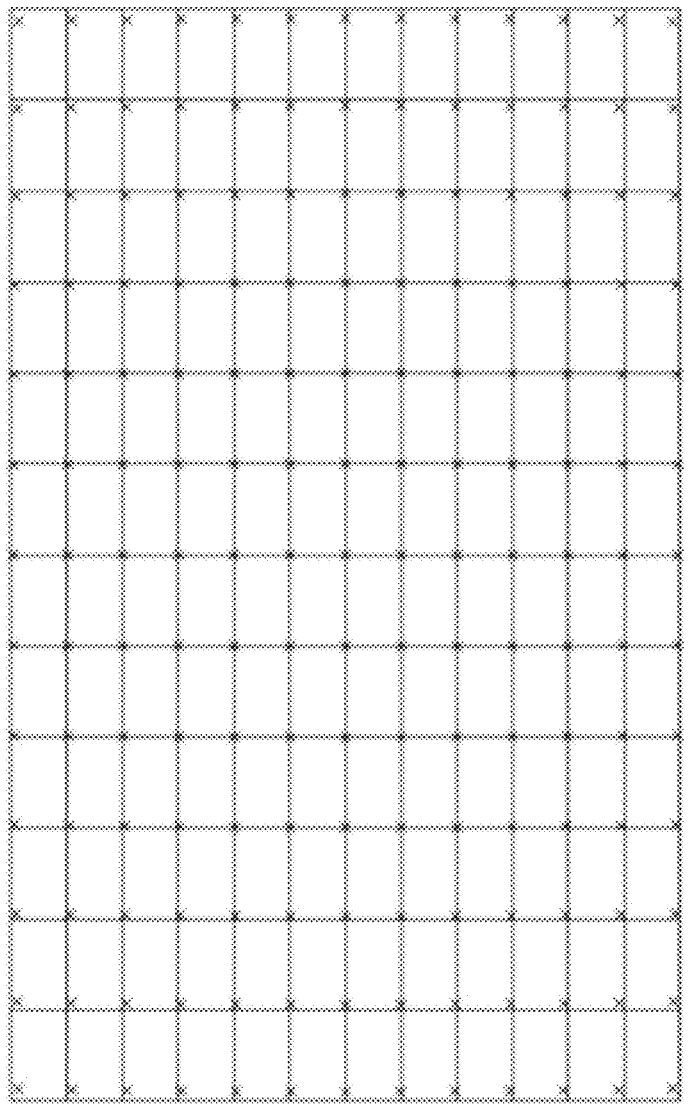
FIG. 8 shows an exemplary distortion grid for the Applicant's system.

FIG. 8 shows an exemplary distortion grid. Distortion at the image source has been measured to be well under control at less than 2.4%.

Telecentric Design

In telecentric design of a point source array, the chief rays from each of the point emitters are all parallel to the optical axis OA in the image source space. Telecentric systems do not change magnification when the image source is displaced in the z direction to either provide accommodation in lieu of using prescription glasses or to provide the augmented images at different far field locations for mitigating vergence accommodation conflict.

As noted previously, a number of conventional optical systems employ pancake optics for providing an ocular for a flat-panel display. However, these systems, being relatively large in size, would not be easily focused by translation of component position along the optical axis. By comparison, the Applicant's optics, using a relatively small image source, can readily provide focus control using source displacement along the axis. In addition, telecentricity of the Applicant's optical system allows change in focus without change in magnification.

Figure 9:
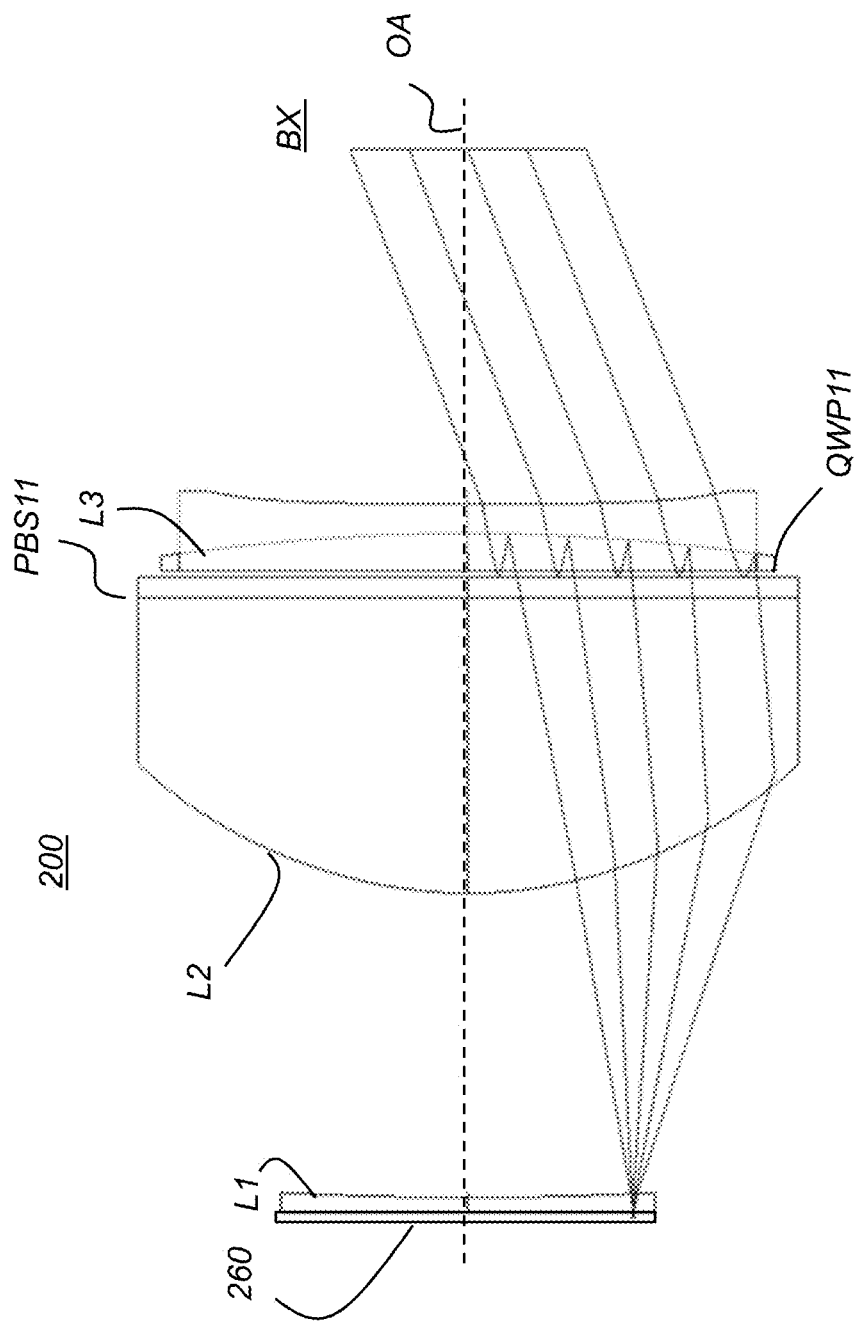
FIG. 9 shows an alternate embodiment, wherein light with respect to the image source is telecentric.

FIG. 9 shows, from a side view, an alternate embodiment, wherein light at image source 260 is telecentric, making the system compatible with use of micro-LEDs, so that the overall apparatus 200 is object-telecentric.

Micro LEDs are formed into an array of small chips that emit light energy into a hemisphere with a Lambertian distribution. The individual emitters in the array are typically separated from each other by a pitch distance that is 3 to 10 times the diameter of the emitter chip. This allows placement of a microlens or lenslet array on the LED chip, sized according to the pitch dimensions, with consequent reduction of the LED divergence, so that the numerical aperture (NA) of the emitted light is reduced from about 1.0 to the inverse ratio of the pitch to chip size. Thus, for example, for 1-micron sized emitters at a pitch of 8 microns between them, the NA for light collected from each of the pixels is ⅛ or 0.125 yielding an NA of f/4.

The use of lenslets for the microLED emitters enables high collection efficiency. With the lenslets in registration (that is, aligned) with the emissive pixels, the centered beams exit the lenslets so that the image source is essentially object-telecentric. In other words, the Chief Ray Angle (CRA) is essentially zero for all field points. FIG. 9 shows an embodiment that uses this telecentric light without the need for adjusting for variation of the CRA over the field.

Advantageously, the surface dimensions of the microLED array can be equal to or smaller than the ocular width dimension. With most conventional eyepiece solutions, the display device dimensions (about the axis) exceed ocular size (about the axis).

It is noteworthy that refractive eyepieces that use only lens devices for light conditioning do not allow as large fields as the Applicant's pancake ocular provides. All-refractive systems exhibit much larger off axis aberrations compared to the catadioptric pancake optics, wherein the optical power is substantially provided by a reflective mirror.

Oculars are required to provide an accessible external entrance pupil where the iris can be placed. An advantage of the curved mirror is that it has an accessible entrance pupil at its center of curvature, positioned away from the mirror. For this reason, most common near-to-eye displays use the configuration known as "bird's bath design". However, the bird's bath design, widely used in a number of prismatic near-to-eye displays, disposes an obliquely slanted beam splitter between the eye and the mirror, which prevents placing the system close to the eye and requires the system be of appreciable size in order to generate images of suitable dimensions.

For example, simply slanting the beam splitter pushes the ocular away from the eye and results in a larger system compared with the pancake having an internal non-slanted beam splitter while using the mirror as the main power element. One could consider using refractive oculars having neither mirrors nor beam splitters; however, those systems normally have their entrance pupil "buried" within the optics and not accessible for placement of the iris. Such approaches typically based on a design known as a "double Gauss" design. The task of "extracting" the pupil from the internals of a refractive design can be highly costly in terms of size and performance.

Thus, the catadioptric pancake lens provides, for the Applicant's system, the benefit of using a mirror that provides an external pupil, without the use of an obliquely slanted, space-consuming splitter. The Applicant system further has a high degree of symmetry about the axis, reducing off axis aberration, and has both telecentricity and a small display device. Small device size and low profile form factor with a large field of view in a head mounted display, using a flat panel electroluminescent light source, is a very desirable and highly sought-after combination of features, not previously achieved and solves a difficult and relevant problem near-to-eye display.

The Applicant's catadioptric pancake optics are also advantaged with relation to field curvature. The curved mirror of the Applicant's catadioptric pancake optics provides a negative field curvature. This arrangement allows other lenses in the pancake assembly to more easily flatten the field, correcting for field curvature. The field lens L1 can have positive power to help achieve field flattening, for example.

Correcting for Focal Accommodation

One recognized problem with near-to-eye display apparatus relates to an inability to change accommodation for objects or regions in the visual field that lie at different distances from the viewer. Near-to-eye displays tend to have a single plane of focus and cannot change focus as needed in order to be appropriate for varying distances between objects in the visual field. This constraint prevents display with "multi-focus" or light-plane capability, having multiple areas of focus within a digital image. Having only a single plane of focus for all of the near and far objects in the image content of a digital display is believed to contribute to the well-known convergence-accommodation discrepancy, evidenced by symptoms ranging from eye-strain to nausea, that occurs in using VR headsets.

In normal vision, light rays from far objects that enter the pupil are essentially parallel, so that the diopter of the viewer's visual system is near a minimum. Rays from nearby objects, however, enter the pupil at divergent angles. The eye responds to this stimulus by increasing the diopter power of the lens. The brain interprets this change in focus as change in distance. Similarly, when the viewer's eyes converge on nearby objects, the brain incorporates this physiologic information into its understanding of distance. When convergence and accommodation are not synchronized, nausea, headache, and eye fatigue can result.

Existing near-to-eye displays have failed to compensate for focal accommodation and related visual cues, leading to significant viewer discomfort and falling short of realistic 3D representation.

Figure 10:
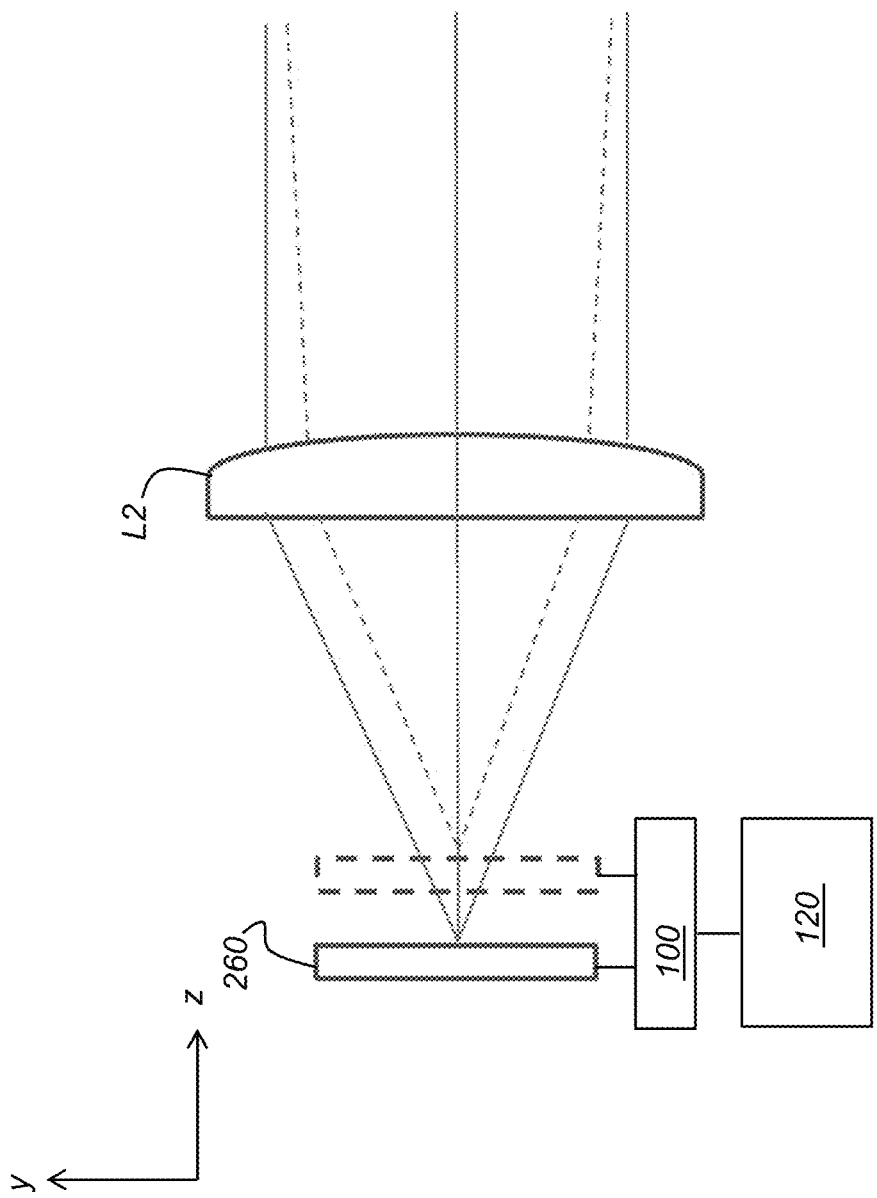
FIG. 10 is a simplified schematic that shows how z-axis translation of a microLED image source can change the ray divergence.
Figure 11:
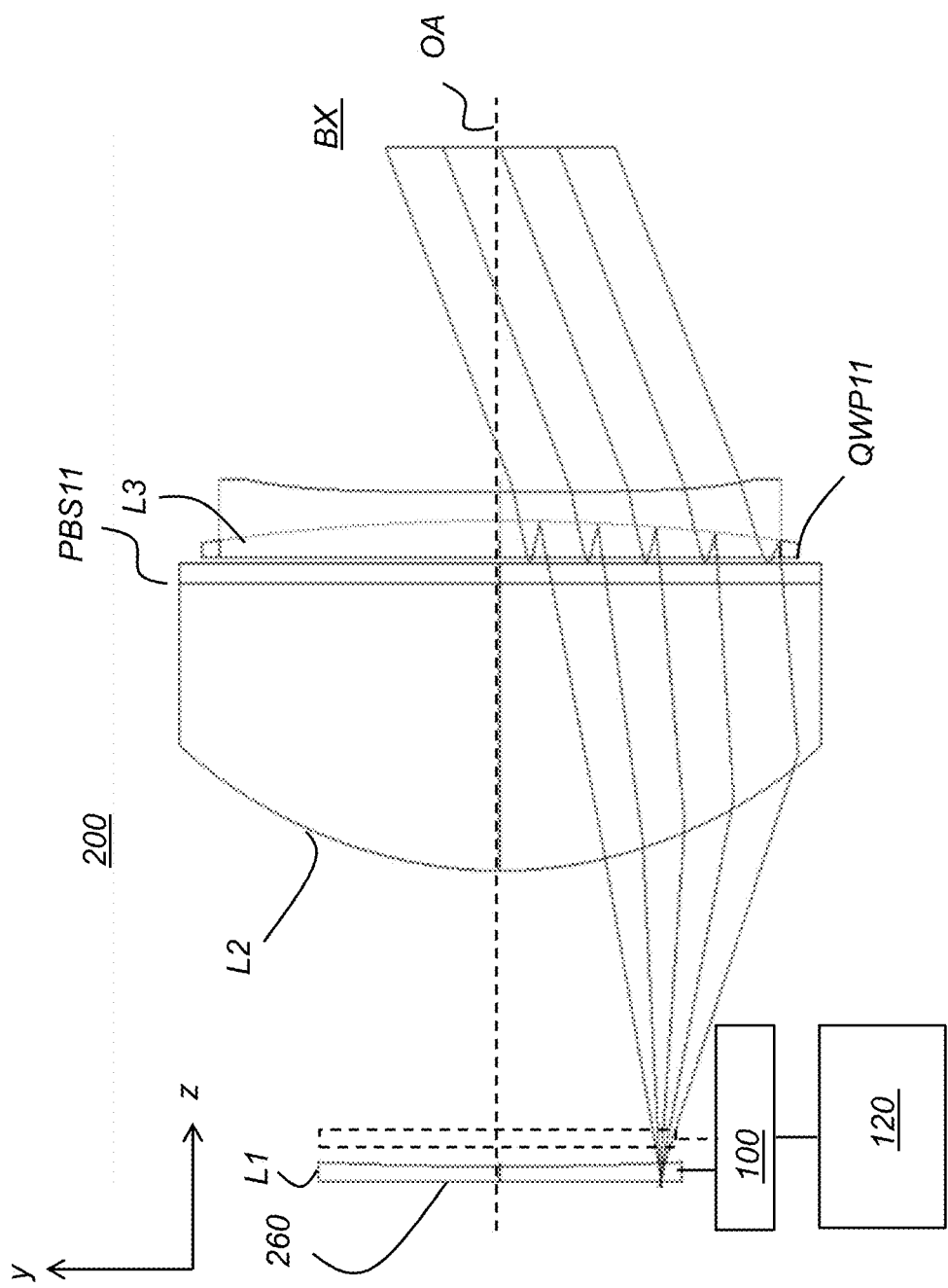
FIG. 11 is a simplified schematic that shows how z-axis translation of a microLED image source can move image-forming components.

The reduced size and weight of the microLED array enables the Applicant's optical system to compensate for focal accommodation by mechanical movement of the optics, so that the stereoscopic images formed have a more genuine 3D appearance and are easier to view. The simplified schematic diagrams of FIG. 10 shows z-axis translation components. FIGS. 10 and 11 show how z-axis translation of the microLED image source 260 towards lens L2 can change the ray divergence for the virtual image that is formed by imaging apparatus 200. An actuator 100 translates source 260 and, alternately, lens L1 along a track (not shown). Actuator 100 can be a piezoelectric motor, or some other type of motor such as an electric motor, for example. A processor 120 analyzes displayed image content and provides drive signals to actuator 100 for translating image source 260 accordingly.

Translation of the position of the image that forms the optical object of the imaging apparatus can alternately be done without mechanical movement.

According to an embodiment of the present disclosure, processor 100 controls source 260 position to vary the diverging ray angles and to generate a sequence of image frames appearing to be at different virtual positions. Programmed logic in processor 100 matches stereoscopic imagery to the appropriate level of diverging rays.

In one exemplary sequence used for improved focal accommodation, a first displayed frame (for both left- and right-eye viewing) shows far objects with parallel rays and stereoscopic imagery that show left and right eye objects in the same place in the frame. A subsequent frame then shows near objects with diverging rays and stereoscopic imagery that show left and right eye image contents laterally displaced from each other relative to the first frame. Thus, for example, in the subsequent frame the imaged element displayed for the right eye is shifted left relative to its position in the first frame; the corresponding imaged element for left eye viewing is shifted right. By cycling between appropriate source 260 positions, or alternately using some other technique for focus variation, acceptable focal accommodation can be achieved. In this way, a near-to-eye imaging apparatus using the present disclosure can generate sequential frames of images with varying diverging ray angles matched with stereoscopic image content for display of left- and right-eye images.

By placing the display module very close to the eye and reducing the size of the components (including the microLED panel), significant improvement in reducing the mass of the microLED array device being moved can be achieved. Not only is the size and mass of the microLED panel reduced, but, because of the small scale of the Applicant's design, as described in more detail subsequently, the distance needed for moving the microLED panel is very small, with the total movement range on the order of less than a millimeter to achieve an adjustment of several diopters.

A typical frame rate is 60 Hz. It can be observed that moving a mass, even a small mass like microLED array, at 60 Hz can be difficult, for reasons of drive power, vibration, and fatigue, for example. In order to use the principles shown in FIG. 10, effectively, it is useful to minimize the size and weight of the microLED assembly.

Because the AV display module is designed to fit very near to the viewer's eye, the Applicant's device is unique in its compact size and in its ability to allow displacement of the microLED array, in order to make a frame-by-frame moving display technique viable.

The invention has been described in detail with particular reference to a presently preferred embodiment, but it will be understood that variations and modifications can be effected within the spirit and scope of the invention. For example, although the above description concentrates on forming an image for one eye, it can be readily understood that corresponding elements and logic are used for forming the stereoscopic images needed to form and coordinate image content for both right- and left-eye images, using methods familiar to those skilled in the stereoscopic imaging arts. The images that are formed can be stereoscopic, with separate left-eye and right-eye images, or monoscopic, with the same image content provided to both eyes for display.

The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. An optical apparatus wearable by a viewer and comprising:
an electroluminescent display that is energizable to emit image-bearing light along an optical axis;
a reflective polarizer in the path of light conveyed through an entry lens and configured to reflect light of a first polarization state and transmit light of a second polarization state that is orthogonal to the first polarization state;
a quarter wave plate (QWP) in the path of transmitted light of the second polarization state and disposed to impart a quarter-wave retardance to conveyed light;
a curved, partially reflective surface in the path of light conveyed through the QWP and treated to transmit a portion of incident light,
and
an exit lens disposed to direct light conveyed from the curved, partially reflective surface to an exit pupil at a viewer eye box, with an eye relief of less than a focal length of an eye,
wherein the optical apparatus is configured for seating directly against the face of the viewer, below an inferior orbital rim,
wherein the optical apparatus is further configured to form an image from the image-bearing light that is peripheral to a primary field of view that lies along a horizontal line-of-sight of the viewer and extends at least 25 degrees above to at least 30 degrees below the horizontal line-of-sight,
wherein an image field of view of the formed image exceeds 40 degrees horizontally and 20 degrees vertically,
wherein the optical apparatus is configured to provide unobstructed visibility of the primary field of view while displaying the formed image.

2. The apparatus of claim 1 further comprising a positive field lens adjacent to the electroluminescent display.

3. The apparatus of claim 2 wherein the light emitted from the electroluminescent display is linearly polarized and the light at the viewer eye box is circularly polarized.

4. The apparatus of claim 1 wherein the electroluminescent display is a microLED array.

5. The apparatus of claim 4 further comprising a lenslet array, disposed adjacent to the microLED array.

6. The apparatus of claim 1 wherein the reflective polarizer has an incident light surface that is orthogonal to the optical axis.

7. The apparatus of claim 1 wherein at least the exit lens lies within the object focal length of the eye.

8. The apparatus of claim 1 wherein the curved, partially reflective surface imparts a negative field curvature to the light.

9. The apparatus of claim 1 wherein at least the electroluminescent display is disposed within an object focal length of an eye of the viewer.

10. The apparatus of claim 1 further comprising an actuator coupled to the image source and energizable to translate the image source between positions along the optical axis.

11. A method comprising:
seating a catadioptric optical apparatus against a face of a viewer, below an inferior orbital rim, wherein the catadioptric optical apparatus is configured to define a viewer eye box with an eye relief within the focal length of the eye and configured to seat below an unobstructed primary field of view that extends in a vertical direction at least 25 degrees above a normal horizontal line-of-sight that extends forward of the viewer, and at least 30 degrees below the horizontal line-of-sight of the viewer, and extends horizontally right and left of the viewer line-of-sight without obstruction, the catadioptric optical apparatus comprising:
(i) a flat-panel electroluminescent display that is energizable to emit image-bearing light along an optical axis;
(ii) a reflective polarizer in the path of light conveyed through an entry lens and configured to reflect light of a first polarization state and transmit light of a second polarization state that is orthogonal to the first polarization state;
(iii) a quarter wave plate (QWP) in the path of transmitted light of the second polarization state and disposed to impart a quarter-wave retardance to conveyed light;
(iv) a curved, partially reflective surface in the path of light conveyed through the QWP and treated to transmit a portion of incident light,
(v) an exit lens disposed to direct light conveyed from the curved, partially reflective surface to an exit pupil at the viewer eye box;
and
energizing the electroluminescent display to form a generated image with an image field of view that lies below the primary field of view.

12. The method of claim 11 wherein the electroluminescent display is a microLED array.

13. The method of claim 12 wherein the catadioptric optical apparatus further comprises a lenslet array, disposed adjacent to the microLED array.

14. The method of claim 11 wherein the generated image field of view extends at least 40 degrees in the horizontal direction.

15. A stereoscopic optical apparatus worn by a viewer and comprising a left-eye optical system and a right-eye optical system, wherein each optical system comprises:
an electroluminescent display that is energizable to emit image-bearing light along an optical axis;
a reflective polarizer in the path of light conveyed through the entry lens and configured to reflect light of a first polarization state and transmit light of a second polarization state that is orthogonal to the first polarization state;
a quarter wave plate (QWP) in the path of transmitted light of the second polarization state and disposed to impart a quarter-wave retardance to conveyed light;
a curved, partially reflective surface in the path of light conveyed through the QWP and treated to transmit a portion of incident light, wherein the curved, partially reflective surface imparts a negative field curvature to the light;

an exit lens disposed to direct light conveyed from the curved, partially reflective surface to an exit pupil at a viewer eye box, with an eye relief of less than 16 mm, wherein the optical apparatus forms an image with an image field of view exceeding 40 degrees horizontally and 20 degrees vertically;

and wherein the exit lens is configured for seating directly against the face of the viewer in order to form the image content peripheral to a primary field of view that lies along a horizontal line-of-sight of the viewer, leaving the primary field of view unobstructed over a visual field extending in the vertical direction from at least 25 degrees above to at least 30 degrees below the horizontal line-of-sight and fully unobstructed in the horizontal direction over the same visual field.

16. The apparatus of claim 15 wherein the electroluminescent display is a microLED array.

17. The apparatus of claim 16 further comprising a lenslet array, disposed adjacent to the microLED array.

18. The apparatus of claim 15 wherein at least the exit lens lies within the object focal length of the eye.

\* \* \* \* \*